United States Patent
Agrawal et al.

(10) Patent No.: US 10,595,162 B2
(45) Date of Patent: Mar. 17, 2020

(54) ACCESS POINT ENVIRONMENT CHARACTERIZATION

(71) Applicant: QUALCOMM Incorporated, San Diego, CA (US)

(72) Inventors: Meghna Agrawal, Sunnyvale, CA (US); Sai Pradeep Venkatraman, Santa Clara, CA (US); Gengsheng Zhang, Cupertino, CA (US); Ju-Yong Do, Cupertino, CA (US); Weihua Gao, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 140 days.

(21) Appl. No.: 15/075,043

(22) Filed: Mar. 18, 2016

(65) Prior Publication Data

US 2017/0272911 A1    Sep. 21, 2017

(51) Int. Cl.
*H04W 24/00* (2009.01)
*H04W 4/02* (2018.01)
*H04L 29/12* (2006.01)
*H04W 4/33* (2018.01)
*G01S 5/02* (2010.01)

(52) U.S. Cl.
CPC .......... *H04W 4/027* (2013.01); *G01S 5/0236* (2013.01); *G01S 5/0242* (2013.01); *H04L 61/6022* (2013.01); *H04W 4/33* (2018.02)

(58) Field of Classification Search
CPC ....... H04W 4/02; H04W 64/00; H04W 4/028; H04W 4/027; H04W 4/043; H04W 4/025; H04W 84/12; H04W 36/0088
USPC .......... 455/67.11, 456.1, 45.3, 418, 507, 457
See application file for complete search history.

(56) References Cited

U.S. PATENT DOCUMENTS

| | | | |
|---|---|---|---|
| 7,164,117 B2* | 1/2007 | Breed | B60R 21/01516 250/208.1 |
| 7,844,505 B1* | 11/2010 | Arneson | G06Q 10/087 340/10.2 |
| 8,818,424 B2 | 8/2014 | Emadzadeh et al. | |
| 8,989,053 B1 | 3/2015 | Skaaksrud et al. | |
| (Continued) | | | |

FOREIGN PATENT DOCUMENTS

WO    WO-2013006922 A1    1/2013

OTHER PUBLICATIONS

International Search Report and Written Opinion—PCT/US2017/018092—ISA/EPO—dated May 19, 2017.

*Primary Examiner* — Joseph Arevalo
(74) *Attorney, Agent, or Firm* — Paradice and Li LLP

(57) ABSTRACT

A method of associating environmental context with wireless access points is disclosed. In some embodiments, a method on a user equipment may comprise determining at least one environmental context associated with a subset of one or more Access Points (APs) visible to the UE at an estimated location of the UE. The at least one environmental context associated with the subset may be determined based on one or more of wireless measurements by the UE, and/or sensor measurements by the UE. Further, at least one AP cluster may be determined by clustering the subset of the one or more APs visible to the UE based on the at least one environmental context and the estimated location. Environmental context for APs may be crowdsourced and stored and provided to a UE as location assistance information to facilitate location determination and other functions.

25 Claims, 10 Drawing Sheets

(56) References Cited

U.S. PATENT DOCUMENTS

| | | |
|---|---|---|
| 2005/0237963 A1 | 10/2005 | Storm |
| 2006/0208169 A1* | 9/2006 | Breed .................... B60N 2/002 250/221 |
| 2007/0082677 A1* | 4/2007 | Donald Hart ........ H04W 16/18 455/456.1 |
| 2010/0290397 A1 | 11/2010 | Narayana et al. |
| 2011/0019582 A1 | 1/2011 | Okmyanskiy et al. |
| 2011/0103360 A1* | 5/2011 | Ku .......................... G01S 5/021 370/338 |
| 2012/0040696 A1 | 2/2012 | Siomina et al. |
| 2012/0129544 A1* | 5/2012 | Hodis .................... H04W 48/04 455/456.1 |
| 2012/0129545 A1* | 5/2012 | Hodis .................... G01S 5/0257 455/456.1 |
| 2012/0129559 A1 | 5/2012 | Pochop, Jr. |
| 2012/0157115 A1* | 6/2012 | Jeong .................... H04W 24/02 455/456.1 |
| 2012/0172051 A1* | 7/2012 | Jeong ........................ G01S 1/70 455/456.1 |
| 2012/0195215 A1 | 8/2012 | Jeong |
| 2012/0258732 A1* | 10/2012 | Jeong .................. H04L 12/1432 455/456.1 |
| 2013/0184007 A1 | 7/2013 | Hategan et al. |
| 2013/0217410 A1 | 8/2013 | Ku et al. |
| 2014/0036701 A1 | 2/2014 | Gao et al. |
| 2014/0324590 A1 | 10/2014 | Kong et al. |
| 2015/0004958 A1 | 1/2015 | Wang et al. |
| 2015/0005011 A1 | 1/2015 | Nehrenz et al. |
| 2015/0024774 A1 | 1/2015 | Ostergaard et al. |
| 2015/0045054 A1 | 2/2015 | Emadzadeh et al. |
| 2015/0087238 A1 | 3/2015 | Palanki et al. |

* cited by examiner

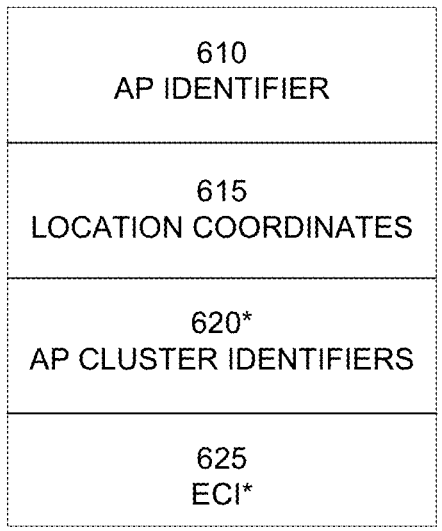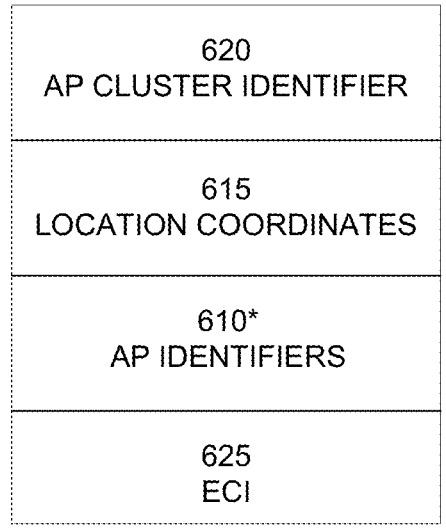
FIG. 6A    FIG. 6B
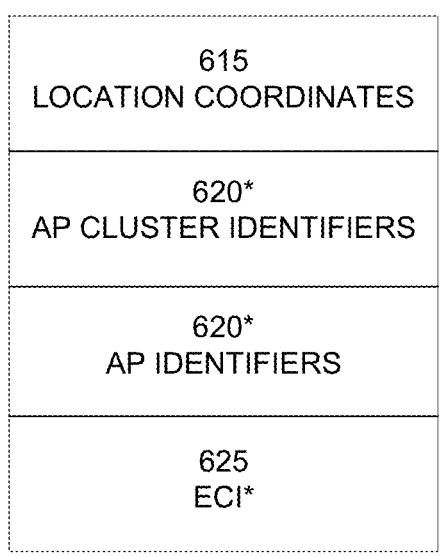
FIG. 6C

ACCESS POINT ENVIRONMENT CHARACTERIZATION

FIELD

The subject matter disclosed herein relates to location determination and specifically, to location determination based on the characterization of wireless access points, in part, by associating environmental attributes with access points.

BACKGROUND

It is often desirable to perform positioning functions on user equipment (UE) such as a mobile terminal, a cellular phone or other mobile device. The terms "location" and "position" are synonymous and are used interchangeably herein. When the location of a UE is known, e.g. from Global Navigation Satellite Systems (GNSS) positioning, the locations of wireless Access Points (APs) that are in signal range may be estimated based on measurements of corresponding AP signals. At indoor locations or other areas where GNSS based location may be unavailable, measurements from Inertial Measurement Units (IMUs), accelerometers and other sensors on the UE may be used to determine a position of the UE. For example, based on measurements by one or more sensors, displacement from a last known GNSS determined position may be obtained. The displacement may then be used to estimate a current location of the UE and/or to estimate a location of an AP based on measurements by UEs in the vicinity.

The techniques above, however, are biased toward APs that are visible at outdoor locations, where UEs may obtain accurate GNSS positioning. IMU and/or sensor drift may limit the accuracy associated with an estimated location of a UE when GNSS signals are unavailable. Consequently, in situations where the estimated location of a UE is at least partially based on sensor measurements, estimates of AP locations based on UE measurements may also be inaccurate. For example, accuracy related to altitude (e.g. building floors) may be less than desirable. Moreover, some techniques merely report raw UE signal measurements, which may limit the utility of those measurements both by a server receiving the measurements or a UE receiving information derived from those measurements.

Techniques for the provision of contextual information in addition to UE measurements may facilitate more accurate AP and UE location determination and characterization.

SUMMARY

In some embodiments, a method on a User Equipment (UE) may comprise: determining, based on one or more of: wireless measurements by the UE, and sensor measurements by the UE, at least one environmental context associated with one or more subsets of Access Points (APs), wherein each of the one or more subsets of APs comprises one or more APs visible to the UE over a time interval; and determining one or more AP clusters by associating the one or more subsets of APs with the at least one environmental context and at least one estimated location of the UE during the time interval, the at least one estimated location of the UE corresponding to the at least one environmental context.

In another aspect, an User Equipment (UE) may comprise: at least one wireless communications interface configured to perform wireless measurements of wireless signals; at least one sensor configured to obtain sensor measurements, and a processor coupled to the at least one wireless communications interface and to the at least one sensor. In some embodiments, the processor may be configured to: determine, based on one or more of: the wireless measurements, and the sensor measurements, at least one environmental context associated with one or more subsets of Access Points (APs), wherein each of the one or more subsets of APs comprises one or more APs visible to the UE over a time interval; and determine one or more AP clusters by associating the one or more subsets of APs with the at least one environmental context and at least one estimated location of the UE during the time interval, the at least one estimated location of the UE corresponding to the at least one environmental context.

In a further aspect, an User Equipment (UE) may comprise: wireless communications interface means to perform wireless measurements of wireless signals; sensing means to obtain sensing means measurements, means for determining, based on one or more of: the wireless measurements, and the sensing means measurements, at least one environmental context associated with one or more subsets of Access Points (APs), wherein each of the one or more subsets of APs comprises one or more APs visible to the UE over a time interval; and means for determining one or more AP clusters by associating the one or more subsets of APs with the at least one environmental context and at least one estimated location of the UE during the time interval, the at least one estimated location of the UE corresponding to the at least one environmental context.

In some embodiments, a non-transitory computer-readable medium may comprise instructions that are executable by a processor to: determine, based on one or more of: wireless measurements by the UE, and sensor measurements by the UE, at least one environmental context associated with one or more subsets of Access Points (APs), wherein each of the one or more subsets of APs comprises one or more APs visible to the UE over a time interval; and determine one or more AP clusters by associating the one or more subsets of APs with the at least one environmental context and at least one estimated location of the UE during the time interval, the at least one estimated location of the UE corresponding to the at least one environmental context.

The methods disclosed may be performed by one or more of servers (including location servers), UEs, etc. using various protocols. Embodiments disclosed also relate to software, firmware, and program instructions created, stored, accessed, read or modified by processors using non-transitory computer readable media or computer readable memory.

BRIEF DESCRIPTION OF THE DRAWINGS

Embodiments of the invention will be described, by way of example only, with reference to the drawings.

FIGS. 6A, 6B, and 6C show an exemplary organization of records in a portion of GIS database 303 according to some disclosed embodiments.

DETAILED DESCRIPTION

Figure 1:
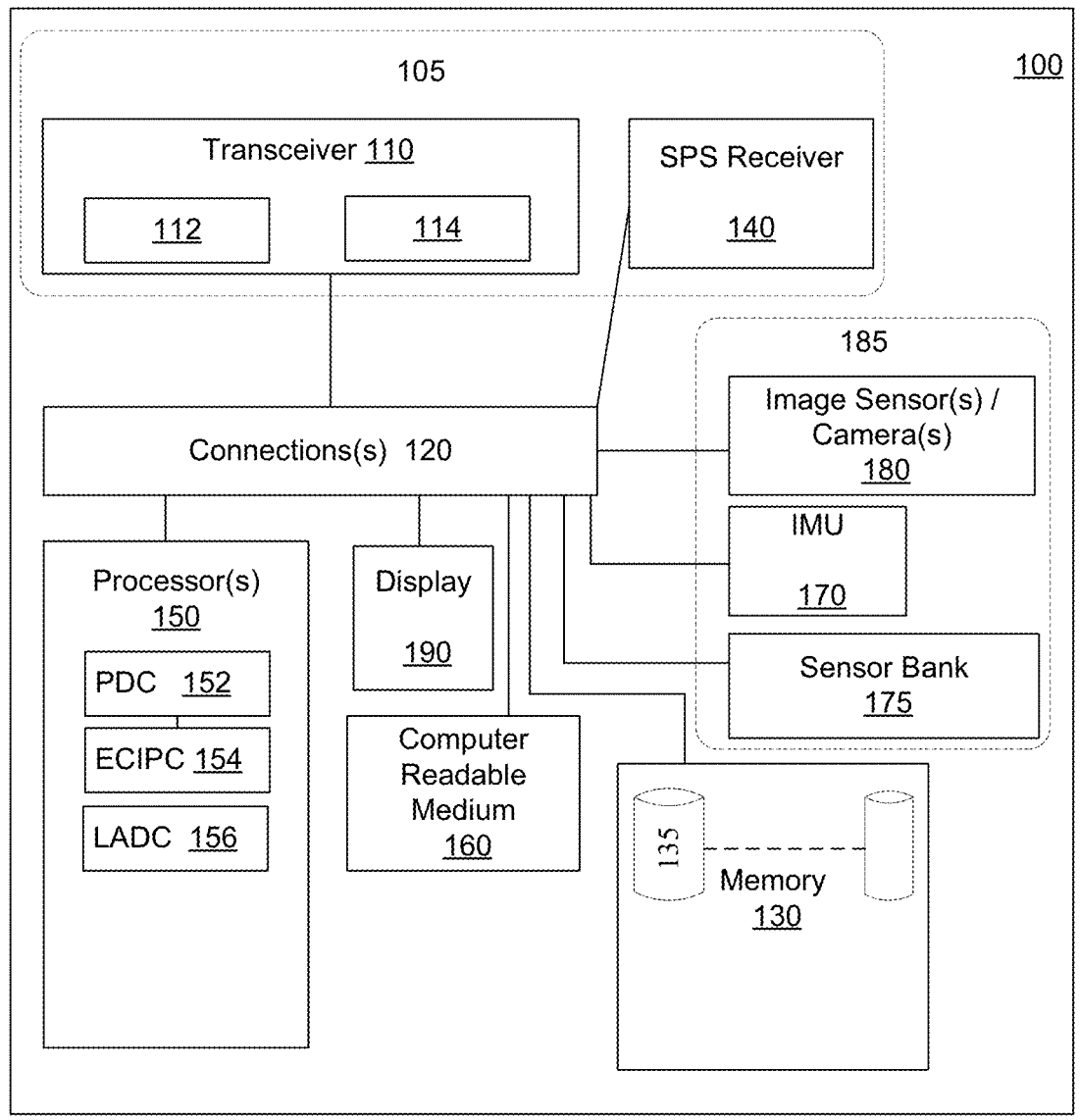
FIG. 1 shows a schematic block diagram illustrating certain exemplary features of UE 100 enabled to access point environmental context determination in accordance with certain embodiments presented herein.

Embodiments disclosed facilitate positioning related operations, in part, by determining and associating one or more environmental contexts, environmental context information, or Environmental Context Identifiers ("ECIs") with one or more APs. In some embodiments, one or more APs in an AP cluster may be geotagged. For example, when a location is available, an AP may be associated with latitude, longitude, altitude and/or other geographical coordinates. ECIs, which may be determined by UEs at a location, may be associated with an AP or an AP cluster visible to the AP at that location. The term "AP cluster" is used herein to refer to one or more APs, which: (i) are at a location and/or visible to a UE in the vicinity of the location, and (ii) have at least one environmental characteristic or ECI in common.

The terms "environmental context," or "environmental context information" or "Environmental Context Identifier (ECI)," are used to refer to an environmental characteristic. For example, the ECI may be a label, code, or description, associated with an environmental context. ECI may be determined based on wireless signal measurements and/or other sensor measurements at one or more locations. For example, ECI may be determined based on signal (wireless and/or sensor) patterns determined from the measurements and/or by comparing a current signal pattern with stored signal patterns. In some embodiments, a subset of APs that are determined to share an ECI and that are visible to a UE at one or more locations within some time interval may be associated with each other to form an AP cluster. In some embodiments, the APs may also be geotagged or associated with geographic locations. The term "visible" when used in the context of an AP refers to radio signals from the AP that may be detected and/or measured by a receiving device such as a UE.

ECIs may include: (i) Current Environmental Context Identifiers (CECIs), which may be determined by current wireless and/or sensor measurements at a location associated with an AP cluster within some time window of a current time; and/or Stored Environmental Context Identifiers (SECIs), which may be based, in part, on aggregated measurements from one or more UEs and associated with an AP cluster. For example, CECIs associated with AP clusters obtained from a plurality of UEs at various times may be aggregated to obtain SECIs associated with the AP cluster. ECI may include a location identifier, description, categorization, or classification of a location and/or an AP cluster. As one example, ECI may categorize a location based on its likely usage or functionality. For example, an area or location may be classified as a parking lot, storefront, café, movie theater, restroom, meeting room, office etc. Further, APs that share one or more ECIs and that are visible to UE at the respective areas may be clustered, associated with a shared ECI, and appropriately categorized. For example, APs in an AP cluster may be categorized as APs associated with a "movie theater" ECI. As another example, ECI may identify or describe the location by a location identifier such as a building name, a business name, a floor number or a relative altitude within a building, the proximity of the location to inter-floor connections in a building such as a stairway, escalator, elevator etc.

In some embodiments, where an estimated location is available, ECIs may include appropriate description(s) of the estimated location. In instances where an estimated location is unavailable or inaccurate, ECI may be used to determine an a more accurate location based on the AP clusters that are seen by a UE at the location, and/or CECIs determined by the UE, and/or SECIs associated with APs seen by the UE and/or UE sensor measurements. In some embodiments, the locations of APs may be determined based, in part, on an estimated location of a UE. For example, the proximity of an AP to an estimated location of a UE may be determined based on wireless measurements such as signal strengths of visible APs and/or round trip time measurements. APs may be identified by their Media Access Control (MAC) address, Basic Service Set Identification (BSSID), Service Set Identification (SSID), or other network identifier.

In some embodiments, a CECI may be obtained by a UE based on wireless signal measurements from one or more APs and/or measurements by sensors on the UE. In some embodiments, the UE may report raw or partially processed measurements to a server or other network entity, which may then derive CECI from the reported measurements associated with the UEs current location and send the CECI to the UE. In some embodiments, the CECI determined by a UE may be reported to a server or another network entity, which may aggregate the reported information with information received from other UEs based on location and/or APs currently visible to the UE at the location. In some embodiments, the crowdsourced aggregated information may be stored as SECI. For example, the reported information may be processed and stored in a Geographical Information System (GIS) database. In some embodiments, SECI provided to a UE may reflect the CECI provided by the UE. For example, a server may obtain an updated SECI by aggregating the CECI received from the UE with existing SECI. The updated SECI, which reflects the CECI, may then be provided to the UE. In some embodiments, the APs that are determined to share an ECI and that are visible to the UE at a location at a time of measurement or within some time window of a time of measurement may be clustered and associated with one or more shared ECIs.

In some embodiments, a server or another entity may also send SECI to a UE based on an estimated location of the UE. The UE may combine the received SECI with wireless signal measurements and/or sensor measurements to determine and/or update a current location of the UE and/or to obtain an updated environmental context. In instances where the UEs position may be unknown or ambiguous, the received SECI and/or CECI may be used to obtain a more accurate location. In some embodiments, the ECI may be used for navigation purposes. For example, the UE may provide navigation instructions based on the location of the UE and known elements or features associated with ECI for visible AP. For example, a user may be instructed to "move toward the elevator" based on an ECI associated with one or more visible APs. In some embodiments, ECI may be provided to the UE as location assistance data.

The terms "user equipment" (UE) or "mobile station" (MS), may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms UE, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered UEs.

FIG. 1 shows a schematic block diagram illustrating certain exemplary features of UE 100 enabled to access point environmental context determination in accordance with certain embodiments presented herein. In some embodiments, functions on UE 100 or one or more associated UEs or other devices (not shown in FIG. 1), may be triggered based on a combination of wireless signal and/or sensor based proximity determinations. In some embodiments, UE 100 may take the form of a wearable user device, such as a wristwatch, spectacles etc., where one or more functional components of UE 100 may be physically separate but operationally coupled to other functional components. For example, display 190 may be physically separate but operationally coupled processor(s) 150 and/or other functional units in UE 100.

UE 100 may, for example, include one or more processing units or processor(s) 150 and memory 130. UE 100 may also include a wireless network interface 105. In some embodiment, wireless network interface may include transmitter 112 and receiver 114, and (as applicable) Global Navigation Satellite System (GNSS) or Satellite Positioning System (SPS) receiver 140. In some embodiments, UE 100 may also include various sensors 185. which may comprise one or more of: optical sensors/camera(s) 180, Inertial Measurement Unit (IMU) 170, and sensor bank 180.

In some embodiments, sensor bank 180 may also include a magnetometer, an altimeter, and/or a barometer, which may provide inputs to processor(s) 150 to facilitate position determination. For example, measurements by the altimeter may be used to provide an indication of altitude above a calibrated level, while the measurements by the barometer may provide an indication of atmospheric pressure, which may also be used to obtain a determination of altitude. As another example, the magnetometer may be capable of measuring the intensity and/or the direction of the Earth's magnetic field and may serve as a compass and/or provide measurements that may be use to obtain an indication of a direction of travel of UE 100. UE 100 may further comprise computer-readable medium 160, display 190, and memory 130, which may be operatively coupled to each other with one or more connections 120 (e.g., buses, lines, fibers, links, etc.). In certain example implementations, all or part of UE 100 may take the form of a chipset, and/or the like.

In some embodiments, processor(s) 150 may also receive input from various other sensors 185 (e.g. in sensor bank 180), which may include one or more of ultrasonic transducers and/or depth sensors, which may be used to acquire depth information and/or determine distance. In general, the list of sensors above in not exhaustive and sensors 180 and/or sensor bank 185 may include various other types of sensors and transducers which are increasingly being incorporated into modern smartphones and other user devices.

SPS receiver 140 may be enabled to receive signals associated with one or more SPS/GNSS resources. Received GNSS signals may be used to determine a position of UE 100. Transceiver 110 may, for example, include a transmitter 112 enabled to transmit one or more signals over one or more types of wireless communication networks and a receiver 114 to receive one or more signals transmitted over one or more types of wireless communication networks.

In some embodiments, UE 100 may comprise image sensors such as CCD or CMOS sensors and/or camera(s) 180, which are hereinafter referred to as "camera(s) 180". Camera(s) 180 may convert an optical image into an electronic or digital image and may send captured images to processor(s) 150. In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processor(s) 150. In some embodiments, camera(s) 180 may be a wearable camera, or an external camera, which may be operationally coupled to, but housed separately from, other functional units in UE 100. In some embodiments, camera(s) 180 may include multiple cameras, front and/or rear facing cameras, wide-angle cameras, and may also incorporate CCD, CMOS, and/or other sensors. In some embodiments, images captured by camera(s) 180 may be used to trigger Vision Based Positioning (VBP). For example, an image of a landmark or point of interest captured by camera(s) 180 in the vicinity of UE 100 may be used in conjunction with input from other sensors such as Inertial Measurement Unit 170 and/or an approximate location of UE 100 to refine a position estimate of UE 100.

In some embodiments, UE 100 may include Inertial Measurement Unit (IMU) 170. In some embodiments, IMU 170, which may comprise 3 axis accelerometer(s), 3-axis gyroscope(s), and/or magnetometer(s), may provide velocity, orientation, and/or other position related information to processor(s) 150. In some embodiments, IMU 170 may be configured to measure and output measured information synchronized to the capture of each image frame by camera(s) 180, and/or measurements taken by sensors 185 in UE 100. In some embodiments, the output of IMU 170 may be used by processor(s) 150 to determine a position and orientation UE 100. For example, when wireless signal based positioning is unavailable, measurements by IMU 170 may be used from a preceding reliable position estimate to estimate a current location of UE 100.

Processor(s) 150 may be implemented using a combination of hardware, firmware, and software. In some embodiments, processor(s) 150 may include Position Determination Component (PDC) 152, ECI Processing Component (ECIPC) 154, and Location Assistance Data Component (LADC) 156.

Position Determination Component 152 (hereinafter PDC 152) may use information derived from sensor and wireless measurements by UE 100 either independently, and/or in conjunction with received location assistance data, which may comprise ECI to determine and/or refine a position estimate for UE 100. At locations where signals are available, position determination may be performed using a variety of well-known techniques including GNSS/Satellite Positioning System (SPS) based positioning, Observed Time Difference of Arrival (OTDOA), Reference Signal Time Difference (RSTD), Advanced Forward Link Trilateralation (AFLT), hybrid SPS-AFLT techniques. At locations where GNSS/SPS signals may not be available, Wireless Local Area Network (WLAN) based positioning, hybrid IMU-wireless techniques, and/or VBP may be used to estimate a location of UE 100. In some embodiments, receiver 114 on UE 100 may receive location assistance information, which may be processed by LADC 156 and provided to ECIPC 154 and PDC 152. In some embodiments, the location assistance information may include ECI for an estimated location of the UE. In some embodiments, UE 100 may send CECI based on information captured by camera(s) 180, sensors 185 and/or IMU 170 to a location server and/or another network entity and receive, based on the CECI, an estimated location of the UE.

For example, UE 100 may send CECI, which may include one or more APs/AP clusters visible to UE 100 at a present location, and receive, in response, an estimated location of UE 100. For example the estimated location may be determined based on the known locations of APs visible to UE 100. As another example, CECI may comprise information that includes a determination that UE 100 is in a parking lot, which is 100 ft from a previously known SPS estimated location. The determination that UE 100 is in a parking lot may be made by ECIPC 154 based on wireless measurements (e.g. GNSS, WLAN. WWAN, and/or WPAN measurements) and/or measurements by sensors on UE 100. Based on the CECI, a network entity may provide coordinates of known parking lots in some radius (e.g. a 100 ft radius) of the SPS determined location to LADC 156. In some embodiments, PDC 152 on UE 100 may combine the received location assistance information with altimeter measurements to determine a floor or parking lot level. For example, UE 100 may indicate that the user is in Parking Lot A at Level 4 (or 40 ft above street level) along with the known coordinates of the parking lot.

LADC 156 may process may process location assistance information including information to assist wireless signal acquisition. The location assistance information may be used to perform SPS/Advanced Forward Link Trilateration (AFLT)/hybrid-AFLT/Received Signal Strength Indicator (RSSI)/Reference Signal Time Difference (RSTD)/OTDOA based position determination. In some embodiments, location assistance information may include wireless measurement assistance information, multipath information, OTDOA assistance information, including Positioning Reference Signal (PRS) assistance information, PRS timing pattern and/or muting information, etc. In some embodiments, LADC 156 may also receive ECI, which may be CECI and/or SECI. For example, in some embodiments UE 100 may send raw sensor measurements over some time period to a network entity and receive CECI as part of location assistance information. As another example, UE 100 may send CECI for a location (e.g. as determined by ECIPC 154) to a network entity and receive (e.g. using LADC 156) SECI associated with that location. As a further example, UE 100 may send CECI for a location (e.g. as determined by ECIPC 154) to a network entity. The network entity may aggregate the CECI with SECI for that location and respond with location assistance information comprising the updated SECI.

The assistance information, which may include ECI, may be processed and forwarded to PDC 152 on processor(s) 150 to select a signal acquisition/measurement strategy and/or to determine an initial location and/or to refine an estimated location and/or to refine the CECI. In some embodiments, LADC 156 on processor(s) 150 may also be capable of processing various other received signals such as Long Term Evolution (LTE) Positioning Protocol (LPP) or LPP extensions (LPPe) messages including assistance information either directly and/or in conjunction with one or more other functional blocks shown in FIG. 1.

ECIPC 154 may determine ECI associated with a location of UE 100. In some embodiments, ECIPC may access SECI in databases 135 in memory 130. In some embodiments, databases 135 may include a GIS. For example, based on measurements by IMU 170, ECIPC may determine a speed of UE 100. In some embodiments, ECIPC may further determine that the user is walking. As another example, based on the speed of the UE and/or communication with a navigation system and/or AP in a vehicle, ECIPC may determine that UE 100 is in a car or another vehicle. In general, ECIPC may use one or more of: (a) sensor measurements over some time period; (b) APs visible at a location or over some time period in the vicinity of a location; (c) SECI associated with a location/AP cluster to determine CECI. In some embodiments, ECIPC may aggregate SECI with CECI and/or update SECI based on CECI. For example, ECIPC 154 may determine CECI based on: (i) the presence of a communicative coupling over a Wireless Personal Area Network (WPAN)/Wireless Local Area Network (WLAN) with UE 100; and/or (ii) measurements of WPAN/WLAN signal strengths for received WPAN/WLAN signals, respectively.

The elements and methodologies described herein may be implemented by various means depending upon the application. For example, these elements and methodologies may be implemented in hardware, firmware, software, or any combination thereof. For example, for a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. One or more of PDC 152, LADC 156 and/or ECIPC 154 may be implemented using hardware (e.g. using functionality provided by an ASIC in processor(s) 150), software running on processor(s) 150, and/or firmware or stored in memory 130, or some combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code may be stored in a non-transitory computer-readable medium 160 or memory 130 that is connected to and executed by processor(s) 150.

Memory may be implemented within processor(s) 150 or external to processor(s) 150. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates position location, ECI determination and/or performance of other functions by UE 100. For example, memory 130 may hold data, program results, as well as data provided by IMU 170, various sensors 185.

In some embodiments, memory 130 comprise databases 135, which may hold ECI including SECI and/or CECI, functional capability information for UE 100 including information to support processing by ECIPC 154. For example, memory 130 and/or databases 135 may hold information about position location capability (e.g. whether SPS, WLAN, IMU and/or vision based positioning) is available on UE 100.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support hybrid photo mapping and navigation in a manner consistent with disclosed embodiments. The code may further support SPS/Advanced Forward Link Trilateration (AFLT)/hybrid-AFLT/Received Signal Strength Indicator (RSSI)/Reference Signal Time Difference (RSTD)/OTDOA measurement and positioning, in part, by using location assistance information.

Computer-readable medium 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 114 indicative of instructions and data. The instructions and data may cause one or more processors to implement SPS/AFLT/hybrid-AFLT/RSTD/OTDOA measurement and positioning, and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions stored thereon, which when executed by at least one processor(s) 150 may be operatively enabled to perform all or portions of the example operations as described herein. Computer readable medium 160 may be a part of memory 130.

Further, UE 100 may include a screen or display 190 capable of rendering color images, including 3D images. In some embodiments, display 190 may be used to display live images captured by camera(s) 180, Graphical User Interfaces (GUIs), maps, program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED) display. In other embodiments, display 190 may be a wearable display or a heads-up display, which may be operationally coupled to camera 180, processor(s) 150, and/or other functional units in UE 100.

Figure 2:
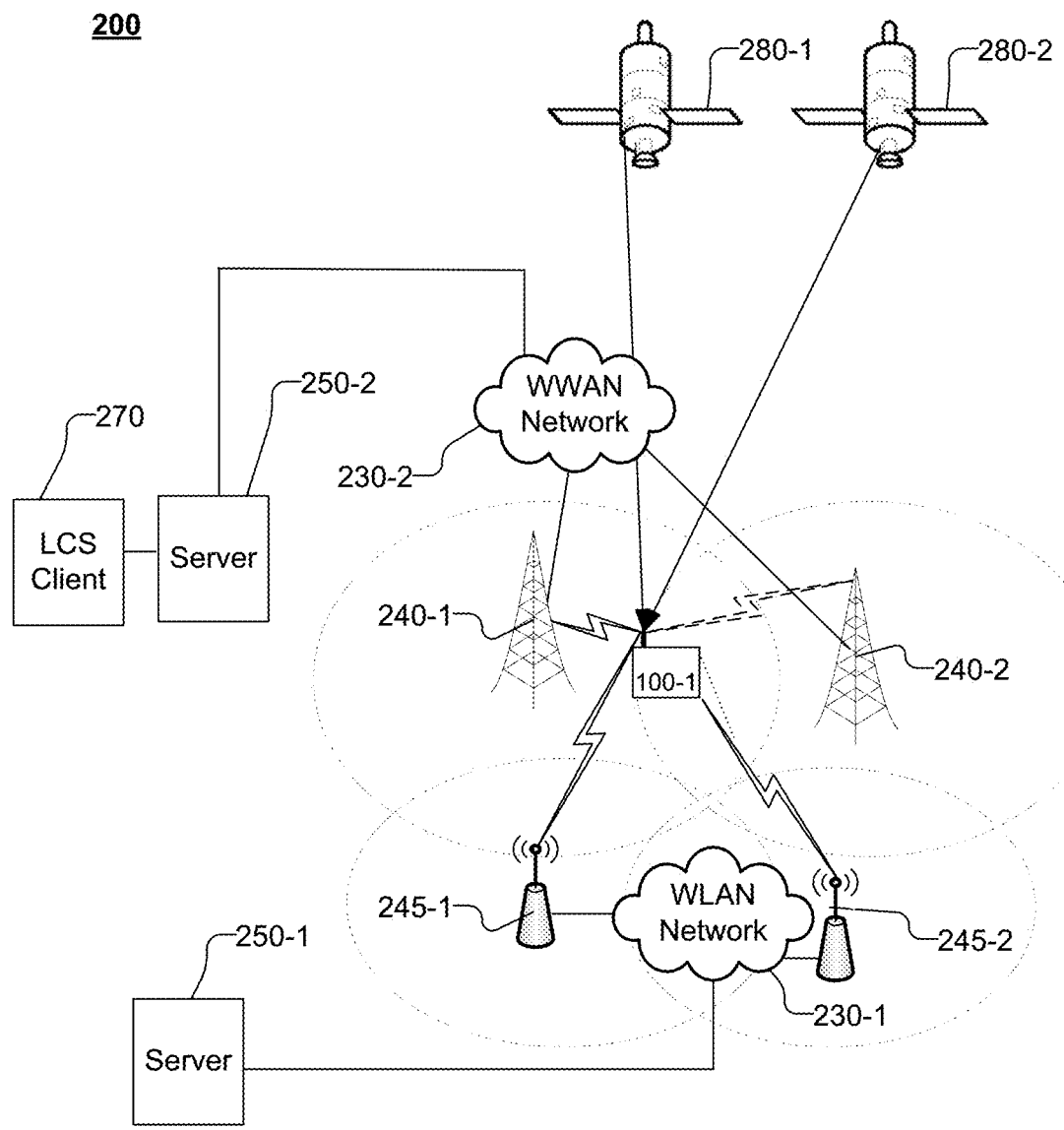
FIG. 2 shows an architecture of a system 200 capable of supporting access point environment characterization in accordance with certain embodiments presented herein.

FIG. 2 shows an architecture of a system 200 capable of supporting access point environment characterization in accordance with certain embodiments presented herein. In some embodiments, system 200 may provide Location Services to UEs. Location services may include the transfer of location assistance data, including ECI, and/or location information, using messages such as Long Term Evolution (LTE) Positioning Protocol (LPP) or LPP extensions (LPPe) messages between UEs 100-$i$ ($1 \leq i \leq n$) and server 150, which, in some instances, may take the form of a location server or another network entity. The transfer of the location information may occur at a rate appropriate to both UEs 100-$i$ and servers 250-1 and/or 250-2 (collectively referred to as servers 250). The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message. In some embodiments, the methods disclosed may be implemented using other protocols including proprietary protocols.

System 200 shows antennas 240-1 and 240-2 (collectively referred to as antennas 240) and Access Points (APs) 245-1 and 245-2 (collectively referred to as APs 245), which may in communication with one or more UEs 100. Antennas 240 may be coupled to server 250-2 through Wireless Wide Area Network (WWAN) 230-2, while APs 245 may be coupled to server 250-1 through Wireless Local Area Network (WLAN) 230-1. Networks 230-1 and 230-2 are collectively referred to as networks 230. In addition, UEs 100 may be communicatively to one or more APs through a WPAN (not shown in FIG. 2). In some embodiments, the communicative coupling of a UE 100 with one or more other devices over a WPAN may be used as an indication of the proximity of UE 100 to the device. For simplicity, only two servers 250 are shown in FIG. 2. In general, system 200 may comprise multiple cells with additional networks 230, multiple UEs 100, various other devices coupled to one or more of networks 230-1 and/or 230-2, servers 250, antennas 240, APs 245, and Space Vehicles (SVs) 180.

One or more UEs 100 may be capable of wirelessly communicating with servers 250 through one or more networks 230 that support positioning and location services, which may include but is not limited to the Secure User Plane Location (SUPL) location solution defined by OMA and the Control Plane location solution defined by 3GPP for use with an LTE serving network. For example, Location services (LCS) may be performed on behalf of LCS Client 270 that accesses server 250-2 (which may take the form of a location server) and issues a request for the location of UE 100. Server 250-2 may then respond to LCS client 270 with a location estimate for UE 100. In some embodiments, UE 100 may provide ECI and/or, visible APs and/or wireless measurements of AP signals, and/or sensor measurements to server 250-2, which may use the measurements to determine a location of UE 100. LCS Client 270 may also be known as a SUPL Agent—e.g. when the location solution used by server 250 and UE 100 is SUPL. In some embodiments, UE 100 may also include an LCS Client or a SUPL agent (not shown in FIG. 2) that may issue a location request to some positioning capable function within UE 100 and later receive a location estimate for UE 100. The LCS Client or SUPL Agent within UE 100 may perform location services for the user of UE 100—e.g. provide navigation directions or identify points of interest in the vicinity of UE 100.

Server 250-2 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDC), a Standalone SMLC (SAS), and/or the like.

As illustrated in FIG. 2, UE 100 may communicate with server 250-2 through network 230-2 and antennas 240, which may be associated with network 230-2. UE 100 may receive and measure signals from antennas 240, which may be used for position determination. In some embodiments, antennas 240 may form part of a wireless communication network, which may be a wireless wide area network (WWAN). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available.

As illustrated in FIG. 2, UE 100 may also communicate with server 250-1 through network 230-1 and APs 245, which may be associated with network 230-1. UE 100 may receive and measure signals from APs 245, which may be used for position determination. In some embodiments, APs 245 may form part of a wireless communication network 230-1, which may be a wireless local area network (WLAN). For example, a WLAN may be an IEEE 802.11x network.

Further, set 260 of proximate UEs 100-1 through 100-*n*, may be communicatively coupled over a WPAN (not shown in FIG. 2). A WPAN may be a network based on the IEEE 802.15x standards, or some other type of network. For example, a WPAN may take the form of a Bluetooth, Infrared, and/or Near Field Communication (NFC) network.

The techniques may also be implemented in conjunction with other combinations of WWAN, WLAN and/or WPAN. For example, antennas 240 and network 230-2 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

UE 100 may also receive signals from one or more Earth orbiting Space Vehicles (SVs) 280-1 or 280-2 (collectively referred to as SVs 280), which may be part of a satellite positioning system (SPS). SVs 280, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 3:
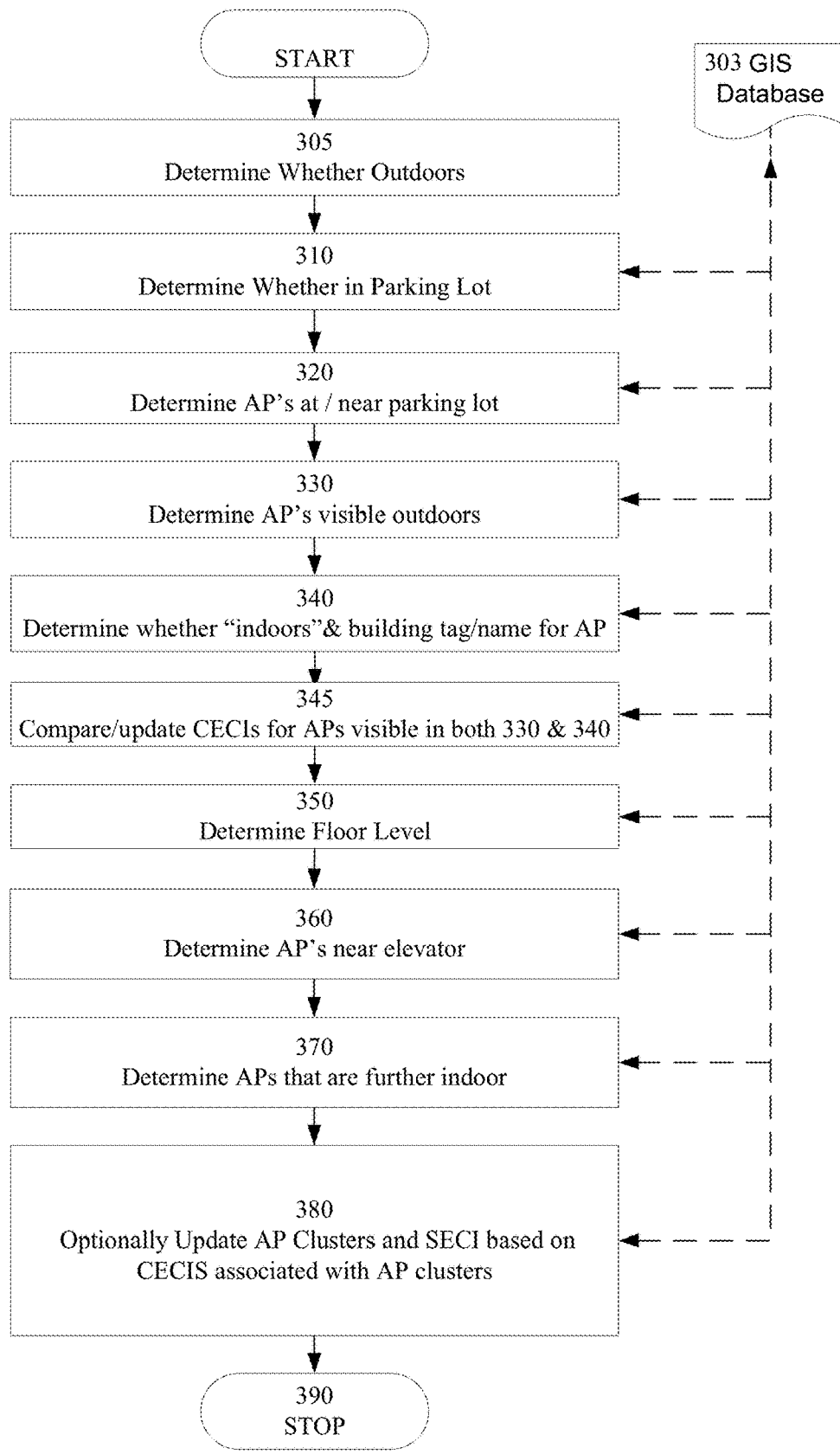
FIG. 3 shows an exemplary method 300 to determine ECI and associate the ECI with an AP cluster.

FIG. 3 shows an exemplary method 300 to determine ECI and associate the ECI with an AP cluster. In some instances, method 300 may be implemented by UE 100. For example, method 300 may be implemented on processor(s) 150, which may use one or more of PDC 152, ECIPC 154, or LADC 156 to perform the described functions. In some embodiments, method 300 may be based, in part, on current available AP measurements and/or ECI information derived from the GIS database 303.

In method 300, UE 100 may receive and/or determine ECI associated with an AP cluster. For example, in some embodiments, UE 100 may use stored GIS information such as SECI to determine an area category specification. The term "area category" information refers to a location description such as Parking lot, Building Name, Floor numbers of APs, Relative altitude for APs, proximity to inter-floor connections in a building such as a stairway, escalator, elevator etc.

In some embodiments, at one or more blocks in FIG. 3, UE 100 may optionally store and/or receive information from GIS database 303. In some embodiments, GIS database 303, which may hold SECI relevant to an approximate current location of UE 100, may be resident on UE 100. For example, GIS database 303 may be resident in or loaded into memory 130, and/or resident on computer-readable medium 160 on UE 100. In some embodiments, GIS database 303 may be one of databases 135 in memory 130. In some embodiments, an uncertainty may be associated with SECI for an AP cluster based on the age of the SECI. For example, the uncertainty associated with SECI may increase with age. In some embodiments, UE 100 or a server 250 to which GIS database 303 is coupled, may weight SECI information based on uncertainty prior to utilizing the SECI, or combining the information with CECI. As another example, if CECI associated with an AP cluster as determined by UEs 100 over some time period conflicts with stored SECI more than some threshold number of times, the SECI may be replaced with the CECI reported by UEs 100.

In some embodiments, a current estimated location of UE 100 may be determined using techniques described earlier in relation to FIGS. 1 and 2. For example, at a given time, an approximate or estimated location of UE 100 may be determined based on SPS/GNSS measurements and/or base stations (BS') on a WWAN network that UE 100 is in communication with, and/or VBP techniques, or some combination of the above methods. In some embodiments, upon determination of an approximate current location UE 100 may update and/or receive a GIS database 303 relevant to its current location from an entity on network 230 (not shown in FIG. 3). In some embodiments, APs with signal strengths above some threshold that are visible to UE 100 at its current location may be geotagged with the current location of the UE in GIS database 303. In some embodiments, a location uncertainty may be associated with a geotagged AP, The location uncertainty associated with a geotagged AP may be updated as additional measurements for the AP are received from UE 100 (or from other UEs).

In some embodiments, GIS database 303 may be resident on server 250 or another network entity (not shown in FIG. 3) and UE 100 may optionally report information to server 250, which may be used to update information in GIS database 303. In some embodiments, UE 100 may receive information from server 250 based on stored and/or updated information in GIS database 303, which may include SECI from server 250. In some instances, UE 100 may request SECI as assistance data from server 250 or another network entity. In some instance, CECI, which may include area category information, may be determined by the MS without assistance from the server.

In some embodiments, GIS database 303 may be optionally updated based on one or more of: available AP signal measurements, the identities of visible APs, or one or more CECIs determined by UE 100 for a current location of UE 100. In some embodiments, UE 100 may receive updated SECI information from GIS database 303 reflecting the CECI information or other UE signal measurements. For example, the MS may use stored GIS information such as SECI to determine an area category specification.

In block 305, UE 100 may determine CECI to be "outdoor" when some threshold number of GNSS satellites are visible and/or based on strong WWAN signal reception from a threshold number of base stations associated with a WWAN network. Further, in some embodiments, a position of UE 100 may be determined. For example, when GNSS information is available, the position of UE 100 may be determined accurately based on the GNSS measurements, the location and one or more APs visible at the location may be associated with an "outdoor" environmental context. For example, APs with a RSSI above some signal strength threshold may be clustered and associated with an "outdoor" environmental context.

As another example, if velocity is greater than a threshold and GNSS Horizontal Dilution of Precision (HDOP) is lower than a threshold, then it may be determined that the current location is outside. For example, CECI associated with a current location of UE 100 may be determined to be "outside" and "in vehicle". Any in vehicle APs may then be clustered and associated with an environmental context of "outdoor" and/or "in-vehicle".

Figure 4:
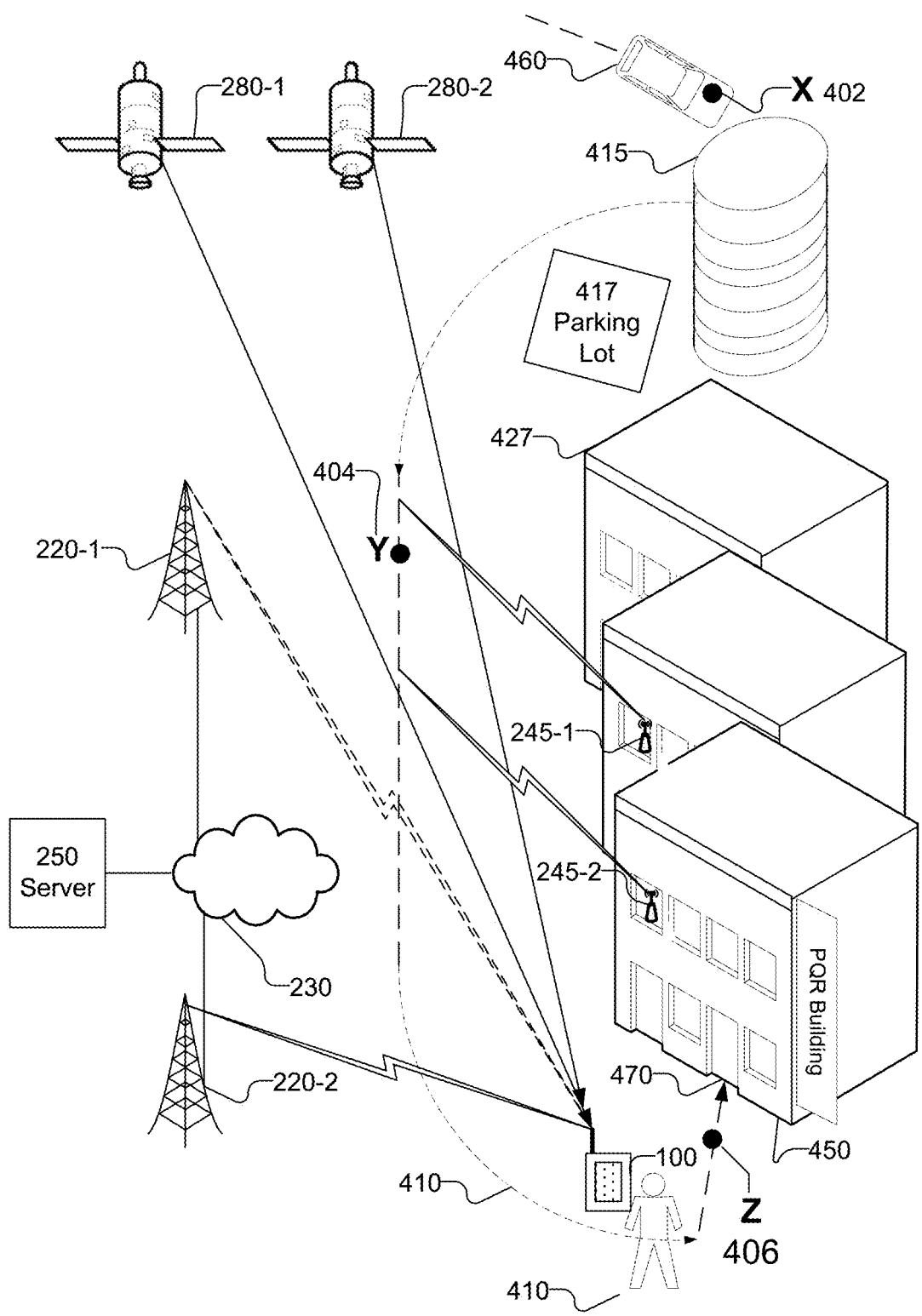
FIG. 4 depicts an exemplary event sequence to illustrate the operation of exemplary method 300.

FIG. 4 depicts an exemplary event sequence to illustrate the operation of exemplary method 300. As a further example, referring to FIG. 4, UE 100 may determine that it is in vehicle 460 at location X 402 at some time t1, based on the speed of UE 100 as determined based on information obtained using SPS 280 and/or measurements by IMU 170 and/or other sensor(s) 185. For example, UE 100 may determine that it is in a vehicle based on communication with a navigation system and/or AP (e.g. via Bluetooth, or another WPAN system) in vehicle 460. As shown in FIG. 4, vehicle 460 may then enter parking structure 415 or parking lot 417. In some embodiments, when APs 245 visible to UE 100 are determined to be in a vehicle, the location of the APs may be determined to be "in-vehicle" or "mobile" to indicate that the APs 245 associated with the vehicle are mobile.

Referring to FIG. 3, in block 310, the MS may determine CECI to be "parking lot" and use a GNSS determined position to associate the current position with CECI or environmental context of "parking lot". In some embodiments, in block 310, UE 100 may detect curves in a parking structure based on sensor measurements (e.g. accelerometer, IMU, GNSS if available), and detect a change in altitude based on barometric measurements and infer that UE 100 is in a parking structure. As one example, as shown in FIG. 4, parking structure 415 may have ramps with multiple curves and levels. Thus, by observing changes in altitude (e.g. from barometric/altimeter measurements) as UE 100 moves between levels in parking structure 415 and speed range and/or by analyzing the device motion and speed, the MS may determine CECI to be "parking lot".

Referring to FIG. 3, as another example, in block 310, the MS may determine that the device is in or near a parking lot and CECI of "parking lot" may be determined by observing changing velocity, an increased frequency of direction changes, and/other patterns associated with parking. For example, referring to FIG. 4, velocity (e.g. as measured by GNSS) will be higher when UE 100 is in vehicle 460, it will gradually reduce to zero when vehicle 460 is parked and then, it will increase again to a walking speed when the user of the UE is walking after parking vehicle 460.

Referring to FIG. 3, in block 310, when parking, the MS may detect a heading change multiple times over a short duration (e.g. a few seconds as a user uses both reverse and forward motion to park a car). In some instances, (e.g. when sensor measurements are unavailable) but location coordinates are known, the MS may request and receive assistance information from a server (based on SECI information in the GIS database 303) indicating that the location corresponds to an area categorized as a "parking lot".

In block 320, the MS may determine visible APs and measure available AP signals at its current location. Based on their signal strengths and/or Round Trip Time (RTT) measurements, one or more of the visible APs may be clustered and associated with a CECI or environmental context of "near parking lot". For example, APs with signal strengths that exceed some threshold and/or which are determined to be within some threshold distance may be clustered and associated with a CECI of "near parking lot".

In some embodiments, the visible APs and corresponding AP signal measurements as well as the CECI determined in step 320 may be reported and UE 100 may update or initiate updating of GIS database 303. In some embodiments, the AP cluster associated with the CECI "near parking lot" may be updated in GIS database 303. For example, if an AP has been seen for the first time, a record for the new AP may be added to GIS database 303 and associated with the location and a SECI of "near parking lot". On the other hand, if an existing AP at that location with SECI "near parking lot" has not been seen for some threshold time period, the AP may be removed from the AP cluster. In some embodiments, records of visible APs with a CECI "near parking lot" that correspond to existing records in GIS database 303 may be updated to reflect the new measurements and time of measurements. In some embodiments, the locations of one or more of the APs may be determined and/or updated based on any new measurements.

Referring to FIG. 4, as the user exits the vehicle and walks toward a building, the MS may see other APs. For example, APs 245-1 and 245-2 may be seen at location Y 404. UE 100 may measure available AP signals at its current location Y 404. In some embodiments, UE 100 may continue to be associated with a CECI "outdoor" because of the visibility of exemplary satellites SVs 280-1 and 280-2. Further, the location Y 404 of UE 100 may be estimated based on GNSS/SPS measurements and/or using WWAN based techniques using cellular signals from antennas 220 or VBP techniques. The user may then continue along trajectory 410 and measurements may continue to be obtained by UE 100 at various points on trajectory 410. For example, wireless, SPS, and/or sensor measurements may be obtained and geotagged and/or time stamped. At location Z 406, the use may obtain a location estimate prior to entering PQR building 450.

As outlined above, based on the visibility of SPS/GNSS satellites, UE may determine that its current location is "outdoor". Further, referring to FIG. 3, in block 330, based on their received signal strength indicator (RSSI) and/or RTT measurements and visibility from outside the building, one or more of the APs (e.g. APs 245-1 and 245-2 in FIG. 4) may be geotagged and clustered and associated with a CECI as "outdoors". The visible APs and corresponding AP signal measurements as well as the determined area category in step 330 may be reported to the server and used to update the GIS database.

In block 340, when the user/UE 100 enters PQR Building 450 at entrance 470, SVs 280 may no longer be visible and UE 100 may determine that a CECI associated with its present location is "indoors". In some embodiments, currently visible APs (e.g. with signal strengths above some threshold) may be clustered and associated with a CECI of "indoors". In some embodiments, UE 100 may continue to determine its location based on measurements by IMU 170 from its last SPS/GNSS/WWAN determined location Z 406. However, because of sensor drift and other biases, a location uncertainty associated with the determined location may be higher. In some embodiments, indoor locations with a location uncertainty below some threshold may continue to be geotagged.

In step 340, as the user enters PQR Building 450 at entrance 470, a CECI of "indoor" may be determined by point of sale, AP (Service Set Identifier, (SSID), WPAN/WLAN communication with some 'internet of things' devices for e.g. printer), connection with indoor Bluetooth devices etc. Further, in step 340, the MS may obtain building name information from the GIS database based on its current location. For example, if the MS location is known, e.g. relative to location Z 406, the MS may receive assistance information from the server based on SECI in the GIS database with a building name (e.g. of "PQR Building" 450 in FIG. 4) or tag and/or other information relevant to the current location of the user. In some instances, where the MS obtains a building map or other assistance information from an AP in the vicinity, information in the building map may be used to determine a building name or tag. In some instances a building tag may be generated based on ECIs associated with APs that are currently visible. In some embodiments, information captured by camera(s) 180 may be used to determine a building name CECI such as "PQR Building".

In some embodiments, in block 345, RSSI and RTT measurements of APs seen in both steps 330 and 340 may be compared. For example, Received Signal Strength Indicator (RSSI) and Round Trip Time (RTT) measurements such as, for example, RTT2/RTT3 scan measurements for the recent AP cluster seen in step 330 and associated with the "outdoor" CECI may be compared with RSSI and RTT measurements of currently (in block 345) visible APs with a CECI being "indoors". APs visible from both outdoors and indoors (e.g. APs associated with an environmental context of both "outdoor" and "indoor") which have higher RSSI and lower RTT2/RTT3 for the "indoor" CECI, may further be clustered with a CECI of "indoors and visible from road". APs with higher RSSI and lower RTT for an "outdoor" CECI may be categorized as "outdoors and near building boundary".

Figure 5:
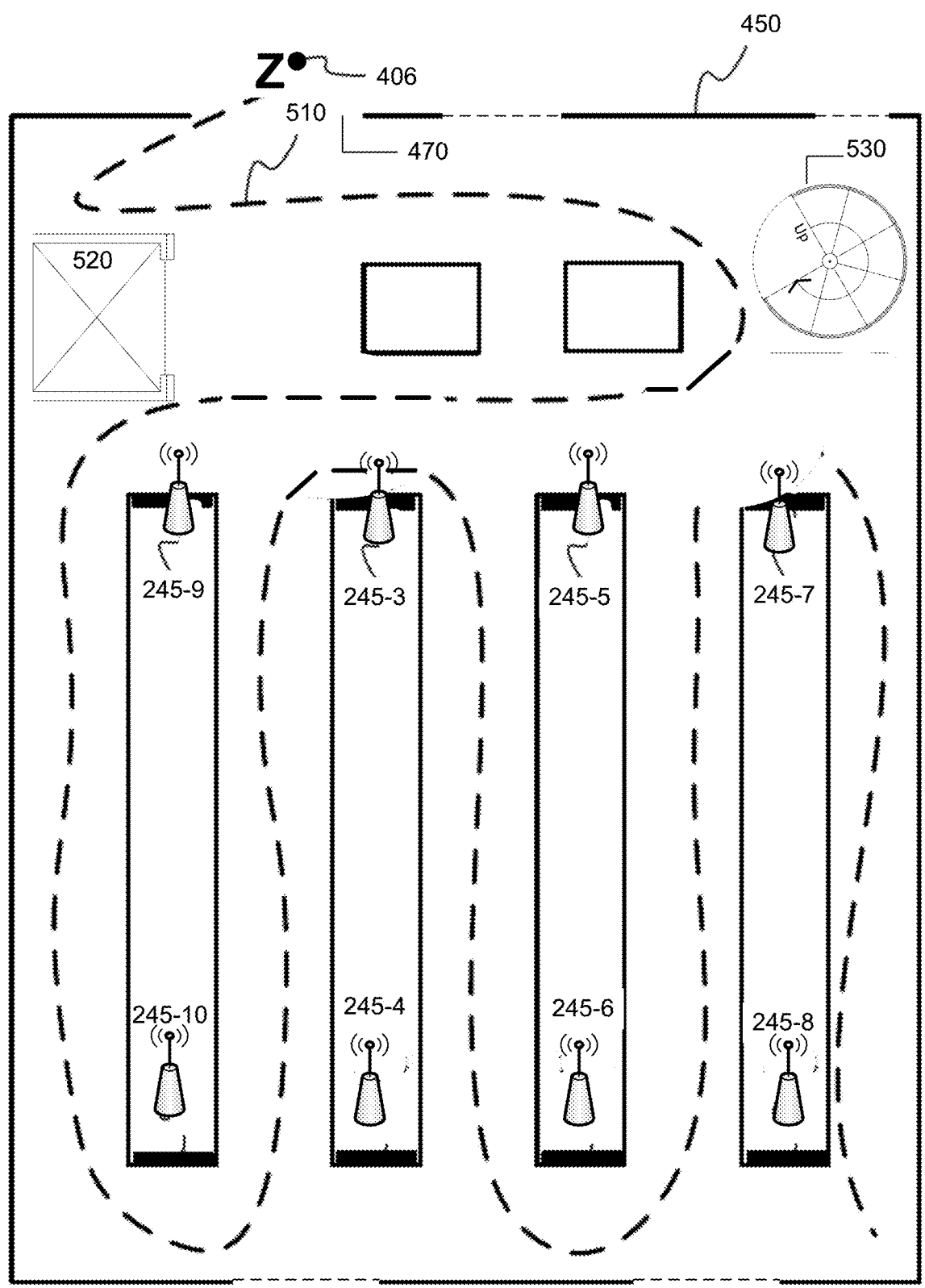
FIG. 5 shows an exemplary indoor map for a location such as PQR Building 450.

Referring to FIG. 5, which shows an exemplary indoor map for a location such as PQR Building 450. In some embodiments, based on ECI and/or an estimated location, UE 100 may receive a building map or other information as location assistance data. As shown in FIG. 5, a user may obtain a location estimate at Z 406 just prior to entering PQR building 450 and follow trajectory 510. In addition, the user may take elevator 520 and/or escalator/stairway 530.

Referring to FIG. 3, in some embodiments, in block 350, a floor level may be determined based on barometric readings. For example, crowdsourced barometric readings for a location of UE 100, which may be stored as SECI in GIS database 303, may be obtained and compared with barometric information for that location obtained from the GIS database/server and used to estimate a floor level. In some embodiments, UE 100 may have information about expected or average barometric readings at a "ground level" for a location and a "floor level" CECI may be determined based on a gradient indicating a variation of the average/expected readings with height (above or below) from barometric pressure at the ground level.

In step 350, AP's 245-3 and 245-9 (near elevator 520 in FIG. 5) and/or 245-5 and 245-7 (near escalator/stairway 530 in FIG. 5), which may be visible to UE 100 just prior to the change in barometric pressure may be clustered and associated with CECI or environmental context of "near elevator/stairway" or "proximate to floor change". Similarly, APs 245 that are visible just after a barometric pressure stabilizes at a new reading (e.g. some time period after a user exits an elevator or arrives at another floor) may also be classified as "near the elevator/stairway" or "proximate to floor change" in step 350. As another example, UE 100 may cluster visible APs 245 just prior to/after a barometric pressure change, and associate the clustered APs 245 with a CECI "near stairway/escalator" or "near elevator" or "proximate to floor change" based on the rate of change of barometer readings in relation to RTT2/RTT3 and/or RSSI measurements.

In some embodiments, UE 100 may increase AP vertical position uncertainty when APs 245 are associated with a CECI corresponding to "near elevator" or "near escalator/stairway" or "proximate to floor change". In some embodiments, UE 100 may assign or update floor levels for APs 245 relatively. For example, APs 245 seen with high RSSI during a floor transition event can be assigned to appropriate floors. Once the AP floor has been identified, crowd sourced barometric/RTT3 measurements can be used to estimate AP altitude and location. In some embodiments, in step 350, UE determined floor level and/or barometric readings associated with one or more AP clusters may be provided to server as CECI and used to update the SECI.

As the user proceeds inside building 450, in block 370, one or more newly visible APs may be clustered and associated with a CECI of "deep indoor". Referring to FIG. 5, for example, APs 245-4, 245-6, 245-8 and 245-10 may be clustered and associated with CECI of "deep indoor".

In block 380, one or more of the AP clusters and corresponding CECIs in a region around a current location of the UE 100 may be used to update SECIs for the AP clusters in GIS database 303. As one example, AP clusters may be added to GIS database 303 if APs have not been previously viewed at the location of the UE, or if new CECI pertaining to one or more AP clusters is available based on measurements in blocks 305-370. In some embodiments, one or more APs 245 may be added or deleted from a cluster based on the CECI. For example, a newly seen AP 245-i may be added to a previously existing AP cluster. As another example, if an AP 245-j associated with an AP cluster has not been seen for some time period, then, AP 245-j may be deleted from the cluster. In some embodiments, the SECI associated with an AP cluster may be updated. For example, based on CECIs associated with AP clusters (as determined by UE 100), a new AP cluster with a subset of APs from a previous cluster may be created. As another example, a new AP cluster associated with SECI "indoor near building boundary" may be created, which may include one or more APs from a previous AP Cluster with SECI "indoor".

FIGS. 6A, 6B, and 6C show an exemplary organization of records in a portion of GIS database 303 according to some disclosed embodiments. In some embodiments, GIS database 303 may reside on server 250, which may be a location server. In some embodiments, portions of GIS database 303 which may be relevant to a UE's current location may be obtained by a UE, for example, as location assistance data.

As shown in FIG. 6A, GIS database 303 may comprise an AP record 605 for each AP 245. An AP record 605 may comprise primary key AP Identifier 610 such as a MAC Address and/or other identifying information unique to an AP. AP record 605 may also comprise location coordinates or an estimate of location coordinates for an AP 245 (if available). For example, an estimated or known location of UE 100 when communicating with an AP may be used as an initial approximation of an AP location. The location may be refined based on measurements by other UEs and/or location information reported by other UEs. For example, the AP location may be refined based on RSSI and/or RTT measurements from one or more UEs. In some embodiments, the location coordinates may be expressed as absolute coordinates, and/or geographical coordinates such as latitude longitude and altitude. In some embodiments, a location uncertainty may be associated with the location coordinates. Further, in AP record 605, each AP identifier 610 may be associated with one or more AP Cluster Identifiers 620 (as indicated by the asterisk). In addition, each AP Identifier 610 may be associated with one or more ECIs 625 (as indicated by the asterisk), which indicate the various environmental contexts associated with the AP.

AP record 605 may be used to determine a location associated with an AP and ECI associated with the AP. For example, if an AP 245 is visible to UE 100 then AP record 605 may be used to estimate an approximate location of UE 100, and/or, determine SECI in the vicinity of UE 100 based on AP Cluster Identifiers 620 associated with the visible AP.

As shown in FIG. 6B, GIS database 303 may further comprise an AP Cluster record 630 for each AP Cluster. AP Cluster record 630 may comprise primary key AP Cluster Identifier 620, which may uniquely identify an AP cluster. For example, an AP Cluster Identifier may be created for each AP Cluster when the AP cluster is first stored in GIS database 303. AP Cluster record 630 may also comprise location coordinates or an estimate of location coordinates for the AP cluster associated with AP Cluster Identifier 620 (if available). For example, an estimated or known location of UE 100 when communicating with one or more APs in the cluster may be used as an initial approximation of the location of the AP cluster. In some embodiments, the AP cluster location may be refined based on RSSI and/or RTT measurements from one or more UEs. In some embodiments, the location of the AP cluster may be based on the locations of the APs in the cluster. For example, the location of the AP cluster may be approximated as the centroid of the locations of the APs in the cluster. In some embodiments, the location coordinates may be expressed as absolute coordinates, and/or geographical coordinates such as latitude longitude and altitude. In some embodiments, a location uncertainty may be associated with the location coordinates.

Further, in AP Cluster record 625, each AP Cluster Identifier 620 may be associated with one or more AP Identifiers 610 (as indicated by the asterisk). AP Cluster record 625 may be used to determine APs associated with the cluster and the ECI associated with the AP Cluster. Since APs may be clustered around an environmental context identified by an ECI, in some embodiments, each AP Cluster record 630 may have one associated ECI 625. If one or more APs associated with an AP cluster are visible to UE 100, then AP Cluster record 630 may be used to determine an environmental context/ECI 625 for UE 100, and/or, determine ECI 625 in the vicinity of UE 100 based on the AP clusters associated with the visible APs.

As shown in FIG. 6C, GIS database 303 may further comprise a location record 635 for each location coordinate in GIS database 303. Location record 635 may comprise primary key Location Coordinates 615, which may uniquely identify a location or a region. Each Location Coordinate 615 may be associated with one or more AP Cluster Identifiers 620 and one or more AP Identifiers 620. Further, Each Location Coordinate 615 may be associated with one or more ECIs 625. In some embodiments, each ECI in location record 635 may correspond to an AP cluster identifier. In some embodiments, when an estimated location of UE 100 is known, location record may be used to determine APs likely to be visible to UE 100 and/or a likely environmental context/ECIs associated with the location of UE 100.

For example, an estimated or known location of UE 100 when communicating with one or more APs in the cluster may be used as an initial approximation of the location of the AP cluster. In some embodiments, the AP cluster location may be refined based on RSSI and/or RTT measurements from one or more UEs. In some embodiments, the location of the AP cluster may be based on the locations of the APs in the cluster. For example, the location of the AP cluster may be approximated as the centroid of the locations of the APs in the cluster. In some embodiments, the location coordinates may be expressed as absolute coordinates, and/or geographical coordinates such as latitude longitude and altitude. In some embodiments, a location uncertainty may be associated with the location coordinates.

Further, in AP Cluster record 625, each AP Cluster Identifier 620 may be associated with one or more AP Identifiers 610 (as indicated by the asterisk). AP Cluster record 625 may be used to determine APs associated with the cluster and the ECI associated with the AP Cluster. Since APs may be clustered around an environmental context identified by an ECI, in some embodiments, each AP Cluster record 630 may have one associated ECI 625. If one or more APs associated with an AP cluster are visible to UE 100, then AP Cluster record 630 may be used to determine an environmental context/ECI 625 for UE 100, and/or, determine ECI 625 in the vicinity of UE 100 based on the AP clusters associated with the visible APs.

Figure 7:
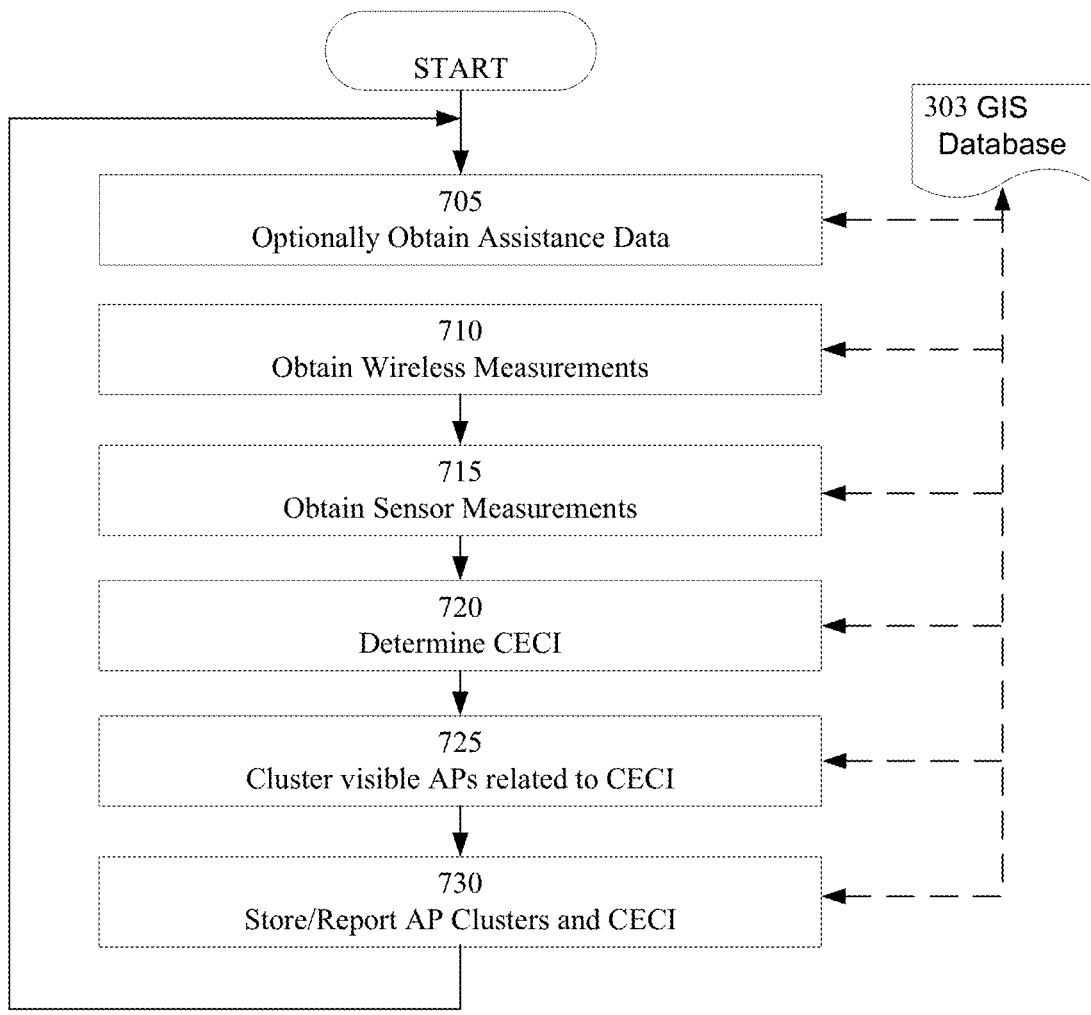
FIG. 7 shows an exemplary flowchart of a method 700 to determine ECI for a UE at a location.

FIG. 7 shows an exemplary flowchart of a method 700 to determine ECI for a UE at a location. In some embodiments, method 700 may be performed by UE 100, server 250 and/or a combination thereof.

In block 705, assistance data may be optionally obtained. For example, UE 100 may request assistance data from server 250, which may send assistance data to UE 100 in response to the request. In some embodiments, UE 100 may estimate its location based on the received assistance data. In some embodiments, the assistance data may be based, in part, on information in GIS database 303.

In block 710, wireless measurements at the current location of UE 100 may be obtained. For example, UE 100 may make wireless signal measurements of one or more visible APs. In some embodiments, UE 100 may send raw measurements to server 250. In some embodiments, if assistance information was received in block 705 or 710, UE 100 may perform wireless measurements based, in part, on the received assistance information. In some embodiments, server 250 may obtain wireless measurements reported by UE 100.

In some embodiments, in block 715, sensor measurements may be obtained. In some embodiments, UE 100 may make sensor measurements pertaining to its current environment. For example, UE 100 may obtain measurements from IMU 170, image sensor(s) 180, and/or from sensors 185, which may include barometric measurements. In some embodiments, UE 100 may send raw measurements to server 250. In some embodiments, server 250 may obtain sensor measurements reported by UE 100.

In block 720, CECI may be determined based on the wireless and/or sensor measurements. In some embodiments, if SECI is received in block 720, UE 100 may determine a CECI based, in part, on the received SECI. In some embodiments, server 250 may determine a CECI based on wireless and/or sensor measurement received from UE 100. In some embodiments, CECI determined by server 250 may be based, in part, on SECI information in GIS database 303.

In block 725, a subset of the visible APs that are related to the CECI may be clustered. In another embodiment, server 250 may cluster APs related to a CECI based on the received measurements and CECI determined in block 720.

In block 730, the AP clusters and associated information may be reported to server 250 and/or stored in GIS database 303. In some embodiments, UE 100 may determine the AP clusters and associated CECIs, which may be reported to server 250. Another iteration may then be commenced. In some embodiments, each iteration may be performed periodically. In some embodiments, the periodicity may be varied based on the speed of UE 100 as determined by IMU 170 and/or based on SPS/GNSS measurements.

Figure 8:
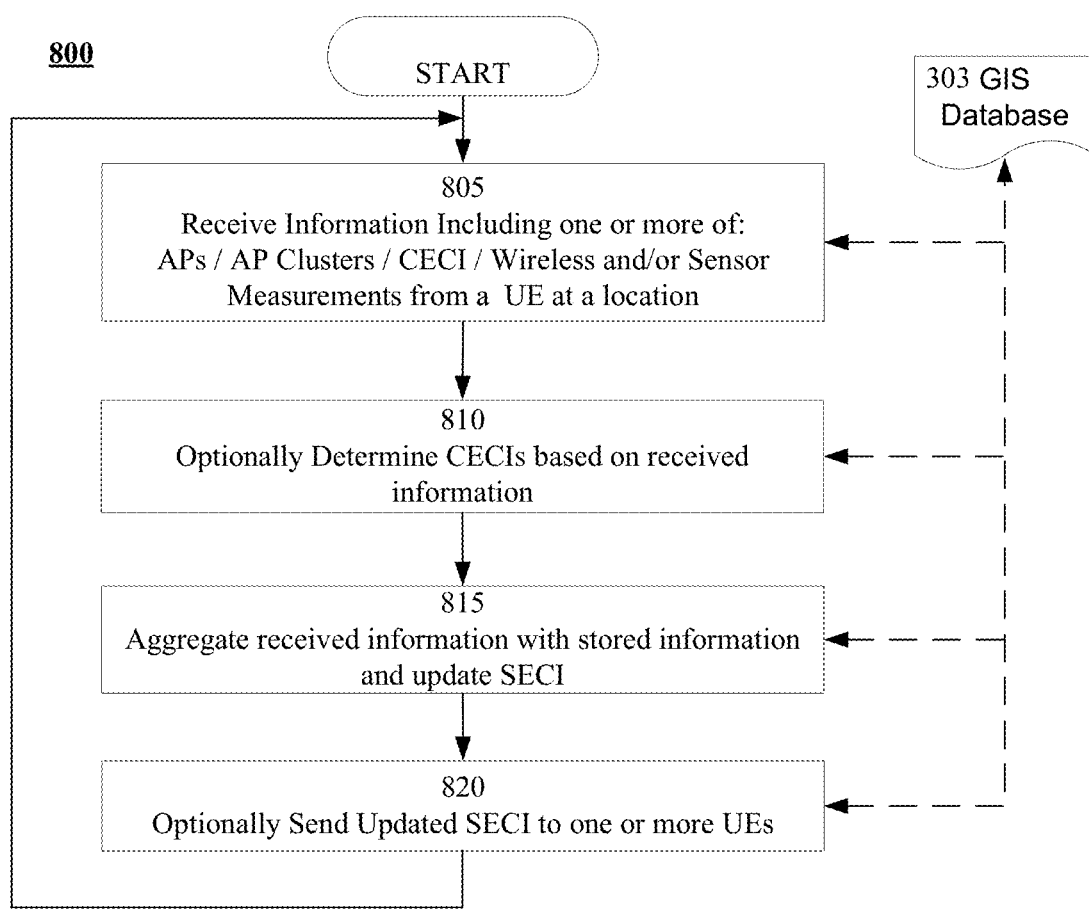
FIG. 8 shows an exemplary flowchart of a method 800 to determine ECI for a UE at a location.

FIG. 8 shows an exemplary flowchart of a method 800 to determine ECI for a UE at a location. In some embodiments, method 800 may be performed by server 250.

In block 805, one or more of: visible APs, wireless measurements at the current location of UE 100, and/or sensor measurements from UE 100 at a location, may be received. In some embodiments, the received information in block 805 may include AP clusters and CECIs associated with the AP clusters.

Optionally, in block 810, if r no AP cluster or CECIs were received in block 80, then, AP clusters and associated CECIs may be determined based on the information received in block 805.

In block 815, the AP cluster and associated CECI information may be aggregated with information in GIS database 303. For example, ECI information associated with an AP cluster maybe updated based on the CECI. In some embodiments, APs in an AP cluster, and/or locations of one or more APs/AP clusters may be updated. In some embodiments, new AP clusters may be created and/or one or more APs may be deleted from an AP cluster. In some embodiments, the measurement information may be analyzed to determine new patterns and create criteria for new environmental contexts. Further, based on the stored information, one or more new AP clusters may be formed based on the new patterns and associated environmental contexts.

In some embodiments, in block 820, information based on the updated SECI may be sent to UE 100 and/or other UEs as location assistance data.

In some embodiments, method 800 may be repeated by a plurality of UEs at various locations so that a crowdsourced GIS database may be obtained and continuously updated with new APs, associated locations, AP clusters and ECI.

Figure 9:
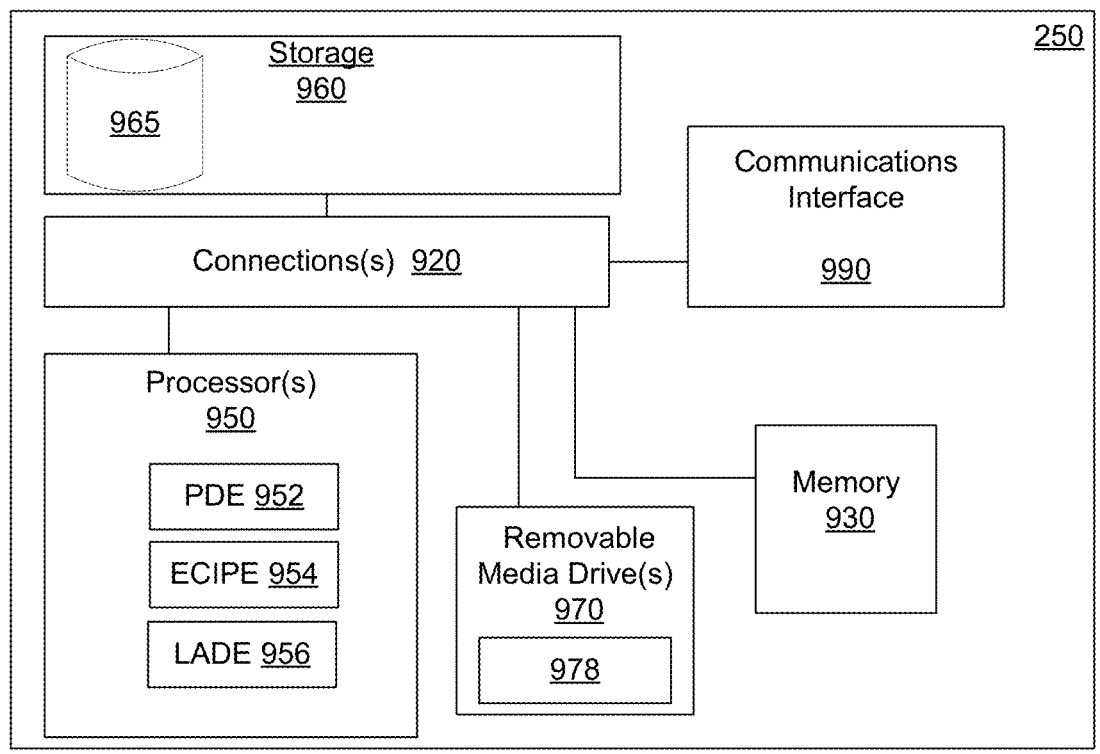
FIG. 9 shows a schematic block diagram illustrating a server 250 to AP environment characterization in accordance with certain embodiments presented herein.

Reference is now made to FIG. 9, which is a schematic block diagram illustrating a server 250 to determine and utilize AP environment characterization in accordance with certain embodiments presented herein. In some embodiments, server 250 may include, for example, one or more processors 950, memory 930, storage 960, and (as applicable) communications interface 990 (e.g., wireline or wireless network interface), which may be operatively coupled with one or more connections 920 (e.g., buses, lines, fibers, links, etc.). In certain example implementations, some portion of server 250 may take the form of a chipset, and/or the like.

Communications interface 990 may include a variety of wired and wireless connections that support wired transmission and/or reception and, if desired, may additionally or alternatively support transmission and reception of one or more signals over one or more types of wireless communication networks. Communications interface 990 may also include interfaces for communication with various other computers and peripherals. For example, in one embodiment, communications interface 990 may comprise network interface cards, input-output cards, chips and/or ASICs that implement one or more of the communication functions performed by server 250. In some embodiments, communications interface 990 may also interface with networks 230

(not shown in FIG. 9) to obtain a variety of network configuration related information, such as SSIDs BSSIDs, Physical Cell Identities, (PCIs), network identifiers and/or timing information used by the base stations in the network. For example, communications interface 990 may make use of the LPP annex (LPPa) protocol defined in 3GPP TS 36.455 or a modification of this protocol to obtain PCI, configured PRS, timing and/or other information from the base stations in network 230. Processor(s) 950 may use some or all of the received information to generate OTDOA and other location assistance data information in a manner consistent with disclosed embodiments.

Processor(s) 950 may be implemented using a combination of hardware, firmware, and software. In some embodiments, processing unit 950 may include server Position Determination Element (PDC) 952, Proximity Element 954, and Location Assistance Data Element (LADC) 956.

Position Determination Element (PDC) 952 may use information derived from received sensor and wireless measurements (e.g. provided by a UE 100 communicatively coupled to server 250) to determine the position of UE 100. For example, the UE may provide wireless measurement to server 250, which may use PDC 954 and data from a Base Station Almanac (BSA) to determine a position of the UE 100 and report the position of the UE to LCS Client 270 and/or to UE 100. PDC 954 may be capable of position determination based on a variety UE of measurements including OTDOA, RSTD, RSSI, AFLT, hybrid SPS-AFLT techniques, UE measurements of signals from APs 245, and/or based on images captured by UE 100 using VBP techniques.

In some embodiments, server location assistance data element (LADC) 956 may retrieve information from BSA, GIS databases such as exemplary GIS database 303, and other sources and provide location assistance information to UE 100. The location assistance information may include ECI. The provided information may be used by UE 100 to estimate an initial location or prefix and/or used to acquire and/or measure wireless signals or determine CECI at its current location. LADC 956 may provide location assistance information comprising ECI, wireless measurement assistance information, multipath information, Observed Time Difference of Arrival (OTDOA) assistance information, including Positioning Reference Signal (PRS) assistance information, PRS timing pattern and/or muting information, etc. In some embodiments, processing unit 950 may generate the OTDOA assistance information as Long Term Evolution (LTE) Positioning Protocol (LPP) or LPP extensions (LPPe) messages. In some embodiments, processor(s) 950 may represent one or more circuits configurable to perform at least a portion of a data signal computing procedure or process related to the operation of server 250.

ECIPC 954 may determine ECI associated with a location of UE 100. In some embodiments, ECIPC 954 may access SECI in databases in memory 930. In some embodiments, databases may include a GIS database such as GIS database 303. For example, based on measurements by UE 100, ECIPC may determine ECI for UE 100. In general, ECIPC 954 may use one or more of received: (a) sensor measurements over some time period; (b) list of APs visible at a location or over some time period in the vicinity of a location; (c) SECI associated with a location/AP cluster to determine CECI. In some embodiments, ECIPC may aggregate SECI with CECI and/or update SECI based on CECI. For example, ECIPC 154 may determine CECI based on: (i) the presence of a communicative coupling over a Wireless Personal Area Network (WPAN)/Wireless Local Area Network (WLAN) with UE 100; and/or (ii) measurements of WPAN/WLAN signal strengths for received WPAN/WLAN signals, respectively.

The elements and methodologies described herein in may be implemented by various means depending upon the application. For example, these elements and methodologies may be implemented in hardware, firmware, software, or any combination thereof. For a hardware implementation, the processing unit 950 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. One or more of server PDC 952, LADC 956 and/or ECIPC 954 may be implemented using hardware (e.g. using functionality provided by an ASIC in processor(s) 950), software running on processor(s) 950, and/or firmware or stored in memory 930, or some combination thereof.

For a firmware and/or software implementation, the methodologies may be implemented using procedures, functions, and so on that perform the functions described herein. Any machine-readable medium tangibly embodying instructions may be used in implementing the methodologies described herein. For example, software may be stored in removable media drive 970, which may support the use of non-transitory computer-readable media 978, including removable media. Program code may be resident on non-transitory computer readable media 978 or memory 930 and may be read and executed by processors 950. Memory 930 may be implemented within processors 950 or external to the processors 950. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 978 and/or memory 930. Examples include computer-readable media encoded with a data structure and computer-readable media encoded with a computer program. For example, non-transitory computer-readable medium 978 including program code stored thereon may include program code to support proxy device usage in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 990, which may store the instructions/data in memory 930, storage 960 and/or relayed the instructions/data to processors 950 for execution. For example, communications interface 990 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 930 may represent any data storage mechanism. Memory 930 may include, for example, a primary memory and/or a secondary memory. Primary memory may include, for example, a random access memory, read only memory, nonvolatile RAM, etc. While illustrated in this example as being separate from processing unit 950, it should be understood that all or part of a primary memory may be provided within or otherwise co-located/coupled with processing unit 950. Secondary memory may include, for example, the same or similar type of memory as primary memory and/or storage 960 such as one or more data storage devices including, for example, hard disk drives, optical disc drives, tape drives, a solid state memory drive, etc. In some embodiments, storage 960 may comprise one or more databases that may hold information pertaining to various entities in system 200 and/or the broader cellular network. In some embodiments, information in the databases may be read, used and/or updated by processors 950 during various computations, including storing or updating ECI, AP clusters, raw measurements, and/or images captured by UE 100, determining an estimated location of UE 100 or APs 245, determining a proximity of UEs 100 to one or more APs 245, generating location assistance data, etc.

In certain implementations, secondary memory may be operatively receptive of, or otherwise configurable to couple to a non-transitory computer-readable medium 978. As such, in certain example implementations, the methods and/or apparatuses presented herein may take the form in whole or part of a removable media drive 970 that may include non-transitory computer readable medium 978 with computer implementable instructions stored thereon, which if executed by at least one processing unit 950 may be operatively enabled to perform all or portions of the example operations including methods 300, 700 and/or 800 as described herein. Computer readable medium 978 may be a part of memory 930.

Figure 10:
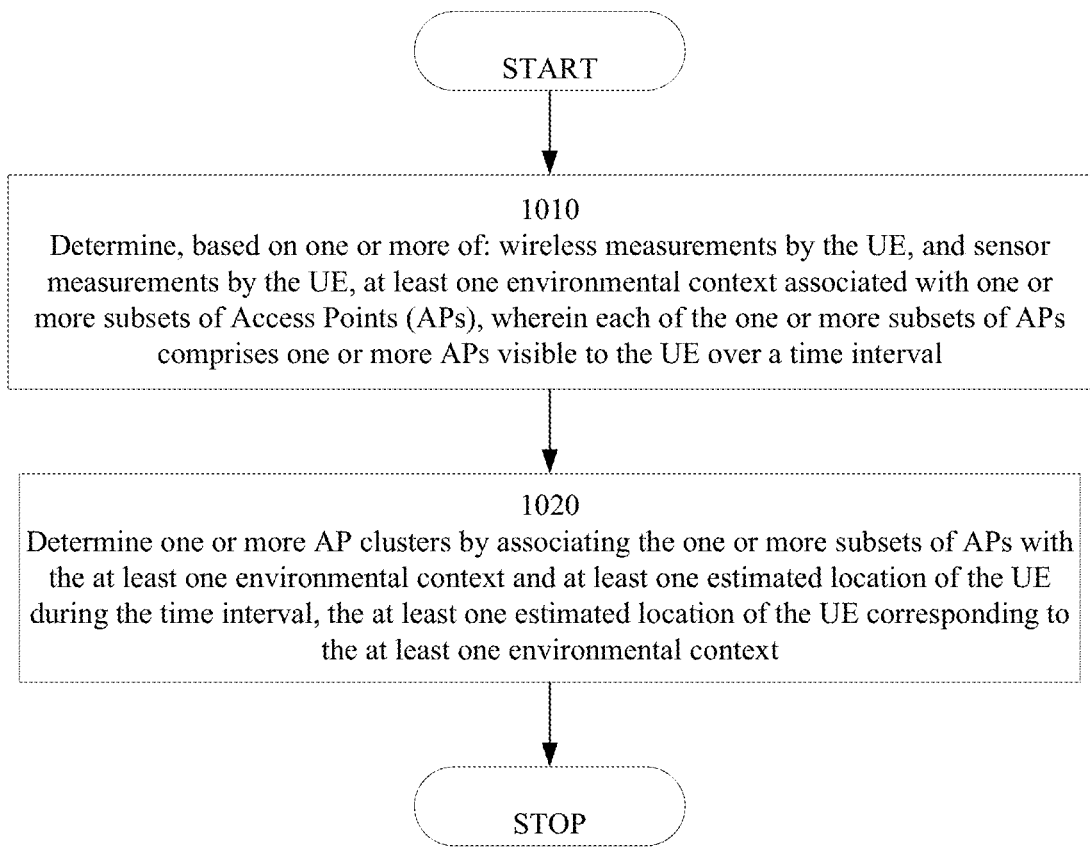
FIG. 10 shows a flowchart of an exemplary method 1000 for clustering APs based on environmental context in accordance with certain embodiments disclosed herein.

FIG. 10 shows a flowchart of an exemplary method 1000 for clustering APs based on environmental context in accordance with certain embodiments disclosed herein. In some embodiments, method 1000 may be performed by UE 100 and/or processor(s) 150 and/or ECIPC 154.

In block 1010, on one or more of: wireless measurements by UE 100, and/or sensor measurements by the UE 100 may be used to determine environmental contexts associated with one or more subsets of Access Points (APs), wherein each of the one or more subsets of APs 245 comprises one or more APs 245 visible to UE 100 over a time interval. The environmental contexts may be determined by one or more of the steps outlined below.

For example, an outdoor environmental context associated with a first subset of the one or more subsets of APs 245 may be determined based on availability of the wireless measurements including SPS measurements (e.g. of SVs 280).

As another example, a vehicular environmental context associated with a second subset of the one or more subsets of APs 245 may be determined based on the speed of UE 100. The speed of UE 100 may be determined based on SPS measurements, or sensor measurements including IMU measurements (e.g. by IMU 170). In some embodiments, when APs 245 visible to UE 100 are determined to be in a vehicle, the location of the APs may be determined to be "in-vehicle" or "mobile" to indicate that the APs 245 associated with the vehicle are mobile and are not associated with a fixed location.

As a further example, a parking lot environmental context associated with a third subset of the one or more subsets of APs 245 may be determined based on the speed of UE 100 and a pattern of movement of UE 100. The speed of UE 100 and the pattern of movement of UE 100 may be determined based on one or more of: SPS measurements, or IMU measurements, or sensor measurements including barometric measurements.

In some embodiments, an indoor environmental context associated with a fourth subset of the one or more subsets of APs 245 may be determined based on non-availability of the SPS measurements.

In some embodiments, a near building boundary environmental context associated with a fifth subset of the one or more subsets of APs 245 may be determined. The APs 245 in the fifth subset may be associated with both the outdoor environmental context and the indoor environmental context. For example, the fifth subset may be obtained by determining an intersection of the first subset of APs and the fourth subset of APs above.

In some embodiments, a building name environmental context associated with a sixth subset of the one or more subsets of APs 245 may be determined. For example, the building name environmental context may be determined based on one or more of: (a) the at least one estimated location of UE 100; and/or (b) a map, where the map includes a building name and UE 100 may associate at least one estimated location of UE 100 with the building location and name, and/or (c) an image of the building captured by UE 100, where the sensor may include an image sensor (e.g. image sensor 185) and images captured by the image sensor may include images of the building.

As another example, a proximity to a floor change environmental context associated with a seventh subset of the one or more subsets of APs 245 may be determined based on visibility of the one or more APs in both: (a) in a first time window prior to a change in the barometric measurements, and (b) in a second time window subsequent to the change in the barometric measurements.

Further, a relative floor level environmental context associated with an eighth subset of the one or more subsets of APs 245 may be determined based on the barometric measurements. For example, the eighth subset of APs 245 associated with the relative floor level environmental context may be determined by: comparing Received Signal Strength Indicator (RSSI) measurements corresponding to the one or more APs visible to UE 100 after a change in the barometric measurements to RSSI measurements for the one or more APs visible to UE 100 prior to the change in the barometric measurements. APs with higher RSSI measurements following the change in the barometric measurements may be associated with a first floor level associated with the relative floor level environmental context; and APs with lower RSSI measurements following the change in barometric measurements may be associated with a second floor level associated with the relative floor level environmental context. Further, the second floor level may be set higher than the first floor level when a barometric reading following the change in the barometric measurements is lower than a barometric reading prior to the change in the barometric measurements. Alternatively, the second floor level may be set lower than the first floor level when the barometric reading following the change in the barometric measurements is higher than the barometric reading prior to the change in the barometric measurements.

In some embodiments, a deep-indoor environmental context associated with a ninth subset of the one or more subsets of APs may be determined based on a distance measured from a time of transition of UE 100 to an indoor environmental context.

In block 1020, one or more AP clusters may be determined by associating one or more of the subsets of APs 245 above with the environmental context and an estimated location of the UE during the time interval, where the estimated location of the UE corresponds to the environmental context. In some embodiments, each AP cluster may be associated with a corresponding AP cluster identifier, at least one corresponding environmental context associated with the subset of APs in the cluster, an estimated location of UE 100. In some embodiments, each AP in the cluster may be identified by a corresponding AP identifier. For example, the corresponding AP identifier may be based on a MAC address of the corresponding AP.

In some embodiments, the estimated locations of UE 100 during the time interval and/or during determination of an environmental context may be determined based on at least one of: (a) SPS positioning, where wireless measurements include SPS measurements; and/or (b) WWAN based positioning, where the wireless measurements include WWAN signal measurements; and/or (c) WLAN based positioning, where the wireless measurements include WLAN signal measurements and/or (d) IMU based positioning. For example, the IMU determined position may be based on a previously determined position of UE 100 within some time window of a point in time in the time interval, where the sensor measurements include IMU measurements; and/or (e) VBP techniques based, in part, on one or more images captured by UE 100, where the sensor includes an image sensor to capture one or more images used for VBP. In some embodiments, the estimated location of UE 100 may be determined based on location assistance information received by UE 100, where the location assistance information may include environmental context information associated with the one or more APs visible to UE 100.

In some embodiments, the method 1000 may further comprise initiating transmission of information pertaining to the one or more AP clusters to a server (e.g. server 250). For example, the transmitted information may include the environmental context(s) associated with the AP cluster, an estimated location (e.g. of UE 100) associated with the AP cluster, and AP identifiers corresponding to AP in the cluster.

Although the disclosure is illustrated in connection with specific embodiments for instructional purposes, embodiments are not limited thereto. Various adaptations and modifications may be made without departing from the scope. Therefore, the spirit and scope of the appended claims should not be limited to the foregoing description.

What is claimed is:

1. A method on a User Equipment (UE) comprising:
    determining, based on wireless measurements by the UE and barometric sensor measurements by the UE, at least one relative floor level environmental context corresponding to one or more subsets of Access Points (APs), wherein each of the one or more subsets of APs comprises one or more APs visible to the UE over a time interval;
    determining, based on the wireless measurements and the barometric sensor measurements, one or more relative floor level AP clusters by associating each of the one or more subsets of APs with the corresponding at least one relative floor level environmental context and at least one corresponding estimated location of the UE during the time interval; and
    determining a building environmental context associated with the one or more subsets of APs based on: the at least one corresponding estimated location of the UE, a map associating the at least one corresponding estimated location of the UE with a building, or an image of the building captured by an image sensor on the UE, or a combination thereof.

2. The method of claim 1, wherein determining the at least one relative floor level environmental context corresponding to the one or more subsets of APs comprises:
    associating a first subset of APs with a first relative floor level environmental context of the at least one relative floor level environmental context, wherein the first subset of APs have higher RSSI measurements relative to a second subset of APs following a change in the barometric sensor measurements; and
    associating the second subset of APs with a second relative floor level environmental context of the at least one relative floor level environmental context, wherein:
        the second relative floor level environmental context is set higher than the first relative floor level environmental context when a barometric sensor reading following the change in the barometric sensor measurements is lower than a barometric sensor reading prior to the change in the barometric sensor measurements, or
        the second relative floor level environmental context is set lower than the first relative floor level environmental context when the barometric sensor reading following the change in the barometric sensor measurements is higher than the barometric sensor reading prior to the change in the barometric sensor measurements.

3. The method of claim 1, wherein the at least one corresponding estimated location of the UE is determined using at least one of:
    Satellite Positioning System (SPS) positioning, the wireless measurements comprising SPS measurements; or
    Wireless Wide Area Network (WWAN) based positioning, the wireless measurements comprising WWAN signal measurements; or
    Wireless Local Area Network (WLAN) based positioning, the wireless measurements comprising WLAN signal measurements; or
    positioning based on Inertial Measurement Unit (IMU) measurements using a previously determined position of the UE, wherein the previously determined position of the UE was determined within a time window of a current time; or
    Vision Based Positioning (VBP) techniques based, in part, on image sensor measurements comprising one or more images captured by an image sensor on the UE; or
    some combination thereof.

4. The method of claim 1, wherein the at least one corresponding estimated location of the UE is determined based on location assistance information received by the UE, the location assistance information comprising stored environmental context information associated with the one or more APs visible to the UE.

5. The method of claim 1, wherein determining the one or more relative floor level AP clusters comprises:
associating, with each of the one or more relative floor level AP clusters, a corresponding AP cluster identifier and the at least one corresponding estimated location of the UE, wherein the corresponding AP cluster identifier is associated with each AP in the AP cluster, wherein each AP is identified by a corresponding AP identifier.

6. The method of claim 5, wherein the corresponding AP identifier is based on a Media Access Control (MAC) address of the corresponding AP.

7. The method of claim 1, further comprising:
initiating transmission of information pertaining to the one or more relative floor level AP clusters to a server, wherein, for each relative floor level AP cluster, the transmitted information comprises: the corresponding at least one relative floor level environmental context, the at least one corresponding estimated location of the UE, and AP identifiers of each AP in the corresponding relative floor level AP cluster.

8. A User Equipment (UE) comprising:
at least one wireless communications interface configured to perform wireless measurements of wireless signals;
at least one barometric sensor configured to obtain barometric sensor measurements,
an image sensor, the image sensor configured to capture images, and
a processor coupled to the at least one wireless communications interface, the image sensor, and to the at least one barometric sensor, wherein the processor is configured to:
determine, based on the wireless measurements and the barometric sensor measurements, at least one relative floor level environmental context corresponding to one or more subsets of Access Points (APs), wherein each of the one or more subsets of APs comprises one or more APs visible to the UE over a time interval;
determine, based on the wireless measurements and the barometric sensor measurements, one or more relative floor level AP clusters by associating each of the one or more subsets of APs with the corresponding at least one relative floor level environmental context and at least one corresponding estimated location of the UE during the time interval; and
determine a building environmental context associated with the one or more subsets of APs based on: the at least one corresponding estimated location of the UE, a map associating the at least one corresponding estimated location of the UE with a building, or an image of the building captured by the image sensor, or a combination thereof.

9. The UE of claim 8, wherein to determine the at least one relative floor level environmental context, the processor is configured to:
associate a first subset of APs with a first relative floor level environmental context of the at least one relative floor level environmental context, wherein the first subset of APs have higher RSSI measurements relative to a second subset of APs following a change in the barometric sensor measurements; and
associate the second subset of APs with a second relative floor level environmental context of the at least one relative floor level environmental context, wherein:
the second relative floor level environmental context is set higher than the first relative floor level environmental context when a barometric sensor reading following the change in the barometric sensor measurements is lower than a barometric sensor reading prior to the change in the barometric sensor measurements, or
the second relative floor level environmental context is set lower than the first relative floor level environmental context when the barometric sensor reading following the change in the barometric sensor measurements is higher than the barometric sensor reading prior to the change in the barometric sensor measurements.

10. The UE of claim 8, further comprising at least one of:
an Inertial Measurement Unit (IMU), the IMU configured to obtain IMU measurements; or
an image sensor, the image sensor configured to obtain image sensor measurements comprising captured images; and
wherein the at least one corresponding estimated location of the UE is determined using at least one of:
Satellite Positioning System (SPS) positioning, the wireless measurements comprising SPS signal measurements; or
Wireless Wide Area Network (WWAN) based positioning, the wireless measurements comprising WWAN signal measurements; or
Wireless Local Area Network (WLAN) based positioning the wireless measurements comprising WLAN signal measurements; or
positioning based on the IMU measurements and a previously determined position of the UE, wherein the previously determined position of the UE was determined within a time window of a current time; or
Vision Based Positioning (VBP) techniques based, in part, on the image sensor measurements; or
some combination thereof.

11. The UE of claim 8, wherein:
the wireless communications interface is configured to receive location assistance information, the location assistance information comprising stored environmental context information associated with the one or more APs visible to the UE; and
the processor is configured to:
determine the at least one corresponding estimated location of the UE based on the received location assistance information.

12. The UE of claim 8, wherein to determine the one or more relative floor level AP clusters, the processor is configured to:
associate, with each of the one or more relative floor level AP clusters, a corresponding AP cluster identifier and the at least one corresponding estimated location of the UE, wherein the corresponding AP cluster identifier is associated with each AP in the AP cluster, wherein each AP is identified by a corresponding AP identifier.

13. The UE of claim 12, wherein the corresponding AP identifier is based on a Media Access Control (MAC) address of the corresponding AP.

14. The UE of claim 8, wherein the processor is further configured to:
initiate transmission of information pertaining to the one or more relative floor level AP clusters to a server, wherein, for each relative floor level AP cluster, the transmitted information comprises: the corresponding at least one relative floor level environmental context, the at least one corresponding estimated location of the UE, and AP identifiers of each AP in the corresponding relative floor level AP cluster.

15. A User Equipment (UE) comprising:
wireless communications interface means to perform wireless measurements of wireless signals;
barometric sensing means to obtain barometric sensing means measurements;
imaging means to capture images;
means for determining, based on the wireless measurements and the barometric sensing means measurements, at least one relative floor level environmental context corresponding to one or more subsets of Access Points (APs), wherein each of the one or more subsets of APs comprises one or more APs visible to the UE over a time interval;
means for determining, based on the wireless measurements and the barometric sensor measurements, one or more relative floor level AP clusters by associating each of the one or more subsets of APs with the corresponding at least one relative floor level environmental context and at least one corresponding estimated location of the UE during the time interval; and
means for determining a building environmental context associated with the one or more subsets of APs based on: the at least one corresponding estimated location of the UE, a map associating the at least one corresponding estimated location of the UE with a building, or an image of the building captured by the imaging means, or a combination thereof.

16. The UE of claim 15, further comprising:
imaging means to capture images; and
means for determining a building name environmental context associated with the one or more subsets of APs based on one or more of: the at least one corresponding estimated location of the UE, a map associating the at least one corresponding estimated location of the UE with a building name, or an image of a building captured by the imaging means.

17. The UE of claim 15, wherein:
the wireless communication interface means receives location assistance information, the location assistance information comprising stored environmental context information associated with the one or more APs visible to the UE; and
the UE further comprises:
means for determining the at least one corresponding estimated location of the UE based on the received location assistance information.

18. The UE of claim 15, wherein means for determining the one or more relative floor level AP clusters, comprises:
means for associating, with each of the one or more relative floor level AP clusters, a corresponding AP cluster identifier and the at least one corresponding estimated location of the UE, wherein the corresponding AP cluster identifier is associated with each AP in the AP cluster, wherein each AP is identified by a corresponding AP identifier.

19. The UE of claim 15, further comprising:
means for initiating transmission of information pertaining to the one or more relative floor level AP clusters to a server, wherein, for each relative floor level AP cluster, the transmitted information comprises: the corresponding at least one relative floor level environmental context, the at least one corresponding estimated location of the UE, and AP identifiers of each AP in the corresponding relative floor level AP cluster.

20. A non-transitory computer-readable medium comprising instructions that are executable by a processor on a User Equipment (UE) to:
determine, based on wireless measurements by the UE and barometric sensor measurements by the UE, at least one relative floor level environmental context corresponding to one or more subsets of Access Points (APs), wherein each of the one or more subsets of APs comprises one or more APs visible to the UE over a time interval;
determine, based on the wireless measurements and the barometric sensor measurements, one or more relative floor level AP clusters by associating each of the one or more subsets of APs with the corresponding at least one relative floor level environmental context and at least one corresponding estimated location of the UE during the time interval; and
determine a building environmental context associated with the one or more subsets of APs based on: the at least one corresponding estimated location of the UE, a map associating the at least one corresponding estimated location of the UE with a building, or an image of the building captured by an image sensor on the UE, or a combination thereof.

21. The non-transitory computer-readable medium of claim 20, wherein the instructions to determine the at least one relative floor level environmental context corresponding to the one or more subsets of APs comprise instructions executable by the processor to:
associate a first subset of APs with a first relative floor level environmental context of the at least one relative floor level environmental context, wherein the first subset of APs have higher RSSI measurements relative to a second subset of APs following a change in the barometric sensor measurements; and
associate the second subset of APs with a second relative floor level environmental context of the at least one relative floor level environmental context, wherein:
the second relative floor level environmental context is set higher than the first relative floor level environmental context when a barometric sensor reading following the change in the barometric sensor measurements is lower than a barometric sensor reading prior to the change in the barometric sensor measurements, or
the second relative floor level environmental context is set lower than the first relative floor level environmental context when the barometric sensor reading following the change in the barometric sensor measurements is higher than the barometric sensor reading prior to the change in the barometric sensor measurements.

22. The computer-readable medium of claim 20, wherein the at least one corresponding estimated location of the UE is determined using at least one of:
Satellite Positioning System (SPS) positioning, the wireless measurements comprising SPS signal measurements; or
Wireless Wide Area Network (WWAN) based positioning, the wireless measurements comprising WWAN signal measurements; or
Wireless Local Area Network (WLAN) based positioning the wireless measurements comprising WLAN signal measurements; or
positioning based on Inertial Measurement Unit (IMU) measurements using a previously determined position of the UE, wherein the previously determined position of the UE was determined within a time window of a current time; or Vision Based Positioning (VBP) techniques based, in part, on image sensor measurements comprising captured images; or some combination thereof.

23. The non-transitory computer-readable medium of claim 20, wherein the at least one corresponding estimated location of the UE is determined based on location assistance information received by the UE, the location assistance information comprising stored environmental context information associated with the one or more APs visible to the UE.

24. The non-transitory computer-readable medium of claim 20, wherein to determine the one or more relative floor level AP clusters, the instructions executable by the processor comprise:

associating, with each of the one or more relative floor level AP clusters, a corresponding AP cluster identifier and the at least one corresponding estimated location of the UE, wherein the corresponding AP cluster identifier is associated with each AP in the AP cluster, wherein each AP is identified by a corresponding AP identifier.

25. The non-transitory computer-readable medium of claim 20, wherein the executable instructions further comprise instructions to:

initiate transmission of information pertaining to the one or more relative floor level AP clusters to a server, wherein the transmitted information comprises: the corresponding at least one relative floor level environmental context, the at least one corresponding estimated location of the UE, and AP identifiers of each AP in the corresponding relative floor level AP cluster.

* * * * *